US012271692B2

(12) United States Patent
Rayles

(10) Patent No.: US 12,271,692 B2
(45) Date of Patent: Apr. 8, 2025

(54) SYSTEMS AND METHODS FOR LANGUAGE IDENTIFICATION IN BINARY FILE FORMATS

(71) Applicant: NBCUniversal Media, LLC, New York, NY (US)

(72) Inventor: Jason Rayles, Brookline, MA (US)

(73) Assignee: NBCUniversal Media, LLD, New York, NY (US)

( * ) Notice: Subject to any disclaimer, the term of this patent is extended or adjusted under 35 U.S.C. 154(b) by 397 days.

(21) Appl. No.: 17/549,469

(22) Filed: Dec. 13, 2021

(65) Prior Publication Data

US 2023/0186020 A1 Jun. 15, 2023

(51) Int. Cl.
*G06F 40/263* (2020.01)
*G06F 16/11* (2019.01)
*G06F 16/14* (2019.01)

(52) U.S. Cl.
CPC .......... *G06F 40/263* (2020.01); *G06F 16/116* (2019.01); *G06F 16/148* (2019.01)

(58) Field of Classification Search
None
See application file for complete search history.

(56) References Cited

U.S. PATENT DOCUMENTS 5,294,982 A * 3/1994 Salomon ................ H04N 7/035 386/E5.028
5,548,507 A * 8/1996 Martino ................ G06F 40/263 704/9
5,913,185 A * 6/1999 Martino ................ G06F 40/263 715/236
6,167,369 A * 12/2000 Schulze ................ G06F 40/284 704/10
6,216,102 B1 * 4/2001 Martino ................ G06F 40/216 704/9
6,415,250 B1 * 7/2002 van den Akker ..... G06F 40/216 704/9
9,720,885 B2 * 8/2017 Susi, III ................ G06F 40/126
2002/0013693 A1 * 1/2002 Fuji ......................... G06F 40/58 704/8
2006/0025988 A1 * 2/2006 Xu ........................ G06F 40/263 704/8

(Continued)

OTHER PUBLICATIONS

Machine-translated version of Seo 2016 (Year: 2016).*

(Continued)

*Primary Examiner* — Jonathan C Kim
(74) *Attorney, Agent, or Firm* — FLETCHER YODER PC

(57) ABSTRACT

The present disclosure generally relates to decoding encoded files. More particularly, the present disclosure relates to systems and processes for determining the underlying language of encoded files having certain file formats with an undeterminable encoding. It may be difficult, time consuming, and costly to decode the files with undeterminable encodings as such files may require the language to be identified prior to decoding. Embodiments disclosed herein relate to determining the underlying language of the files by analyzing bit sequences in the encoded file and comparing the bit sequences against training data to determine matching patterns between the bit sequences in the file and the bit sequences known correspond to terms associated with a particular language.

19 Claims, 23 Drawing Sheets

(56) References Cited

U.S. PATENT DOCUMENTS

| | | | | |
|---|---|---|---|---|
| 2010/0125447 | A1* | 5/2010 | Goswami | G06F 40/58<br>704/8 |
| 2012/0254181 | A1* | 10/2012 | Schofield | G06F 40/126<br>707/E17.046 |
| 2013/0107299 | A1* | 5/2013 | Huh | G06K 15/02<br>358/1.11 |
| 2014/0100845 | A1* | 4/2014 | Hoskinson | G06F 40/263<br>704/8 |
| 2015/0033120 | A1* | 1/2015 | Cooke | G06F 40/194<br>715/256 |
| 2022/0092261 | A1* | 3/2022 | Carvalho | G06N 20/00 |
| 2022/0405472 | A1* | 12/2022 | Shah | G06F 40/35 |
| 2023/0186020 | A1* | 6/2023 | Rayles | G06F 16/148<br>704/9 |
| 2023/0297775 | A1* | 9/2023 | Carvalho | G06N 20/00<br>704/9 |

OTHER PUBLICATIONS

Seo MJ, Kim MH. A Method for Automatic Detection of Character Encoding of Multi Language Document File. KIISE Transactions on Computing Practices. 2016;22(4):170-7. (Year: 2016).*

* cited by examiner

- AFRIKAANS
- ALBANIAN
- AMHARIC
- ARABIC
- EGYPTIAN
- ARMENIAN
- AZERBAIJANI
- BASQUE
- BELARUSIAN
- BENGALI
- BOSNIAN
- BRAZILIAN PORTUGUESE
- BULGARIAN
- BRUMESE
- CANTONESE
- CASTILIAN SPANISH
- CATALAN SPANISH
- CHINESE
- MANDARIN TRADITIONAL
- MANDARIN SIMPLIFIED (SINGAPORE)
- MANDARIN
- SIMPLIFIED
- CROATIAN
- CZECH
- DANISH
- DHIVEHI
- DUTCH
- ENGLISH
- ESTONIAN
- FAROESE
- FINNISH
- FLEMISH
- FRENCH / BELGIUM
- FRENCH CANADA
- FRENCH CONTINENTAL
- GALICIAN
- GEORGIAN
- GERMAN
- GREEK
- GREENLANDIC
- HEBREW
- HINDI
- HUNGARIAN
- ICELANDIC
- INDONESIAN
- INUPIAQ
- ITALIAN
- JAPANESE
- KANNADA
- KAZAKH
- KHMER
- KINYARWANDA
- KOREAN
- KURDISH
- LAO
- NORWEGIAN
- PORTUGUESE
- PANJABI
- PASHTO
- ROMANIAN
- RUNDI
- RUSSIAN
- SERBIAN
- SINHALESE
- SLOVAK
- SLOVENIAN
- ARGENTINIAN
- LATIN AMERICAN SPANISH
- SWAHILI
- SWEDISH
- SWEDISH (FINLAND)
- TAIWANESE
- TAMIL
- TELUGU
- THAI
- TIBETAN
- TONGAN
- TURKISH
- UKRANIAN
- URDU
- VIETNAMESE
- WELSH

```
public static int AutoDetectEncoding(string fileName)
{
    var pac =   new  Pac( ):
    {
        var dictionary =   new  Dictionary<int, string>
        {
          {CodePageLatin, "en-da-no-sv-es-it-fr-pt-de-nl-pl-sq-hr-ro-id" },
          {CodePageGreek, "el" },
          {CodePageLatinCzech, "cs-sk" },
          {CodePageLatinTurkish, "tr" },
          {CodePageCyrillic, "bg-ru-uk-mk" },
          {CodePageHebrew, "he" },
          {CodePageThai, "th" },
          {CodePageArabic, "ar" },
          {CodePageKorean, "ko" },
          {CodePageChineseTraditional, "zh" },
          {CodePageChineseSimplified, "zh" },
          {CodePageJapanese, "ja" },
        }:
        foreach (var kvp in dictionary)
        }:
          var sub = new  Subtitle():
          pac.CodePage = kvp.Key:
          pac.LoadSubtitle(sub, null, filename):
          var languageCode = LanguageAutoDetect.AutoDetectGoogleLanguageOrNull(sut
          if (languageCode != null &&  kvp.Value.Contains(languageCode))
          {
              return kvp.Key:
          }
        }
```

302 — {CodePageLatin, ; 306 — "en ; 304 — AutoDetectWordsEnglish block

```
private static readonly string [] AutoDetectWordsEnglish =
{
    "food", "any", "mountain","we", "are", "and", "your", "what", "[Tw]hat's",
    "You're", "(any|some|every)thing", "money", "because", "human",
    "because", "welcome", "really", "somethine", "confusing", 'about", "know",
    "people", "other", "which", "would", "these", "could"
}:
private static readonly string [] AutoDetectWordsDash =
{
    "mad", "nogen", "bjerg", "vi", "han", "og", "jeg", "var", "men", "gider",
    "bliver", "virkelig", "kommer", "tilbage", "Hej", "langere", "gjorde", "dig",
    "havde", "[Uu] ndsskld", "arbejder", "vidste", "troede", "stadigvaek",
    "[Mm] aske", "forste", "gik", "fortaelle", "begyndy", "spargsmal", "pludselig"
}:
private static readonly string [] AutoDetectWordsNorwegian =
{
    "mat", "noen", "fjell", "vi", "og", "jeg", "var", "men", "igjen", 'Nei",
    "Hei", "npen", "gjore", "kanskje", "[Tt]renger", "tenker", "skjer", "mote",
    "veldig", "takk", "penger", "konsept", "hjelp", "forsvunnet",
    "skutt", "skerkt", "minste", "forste", "fortsette", "innerholder", "gikk",
    "fortelle", "begynt", "sporsmal", "plutselig"
}:
private static readonly string [] AutoDetectWordsSedish =
{
    "mat", "nagra", "fjall", "vi", "ar", "och", "Jag", "inte", "for", "maste', "Oppna",
    "Forlat", "nanting", "ingenting", "javla", "Varfor", "gora", "bevorer", "tillbaka",
    "Varofor", "traffa", "kanske", "saga", "hande", "honom", "hennes", "veckor",
    "tanker", "sjalv", "pratar", "mycket", "mamma", "dodade", "Ursakta", "sager",
    "senaste', "haller", "forstar", "veckan", "varfor", "tycker", "forsta", "gick",
```

Figure 4:
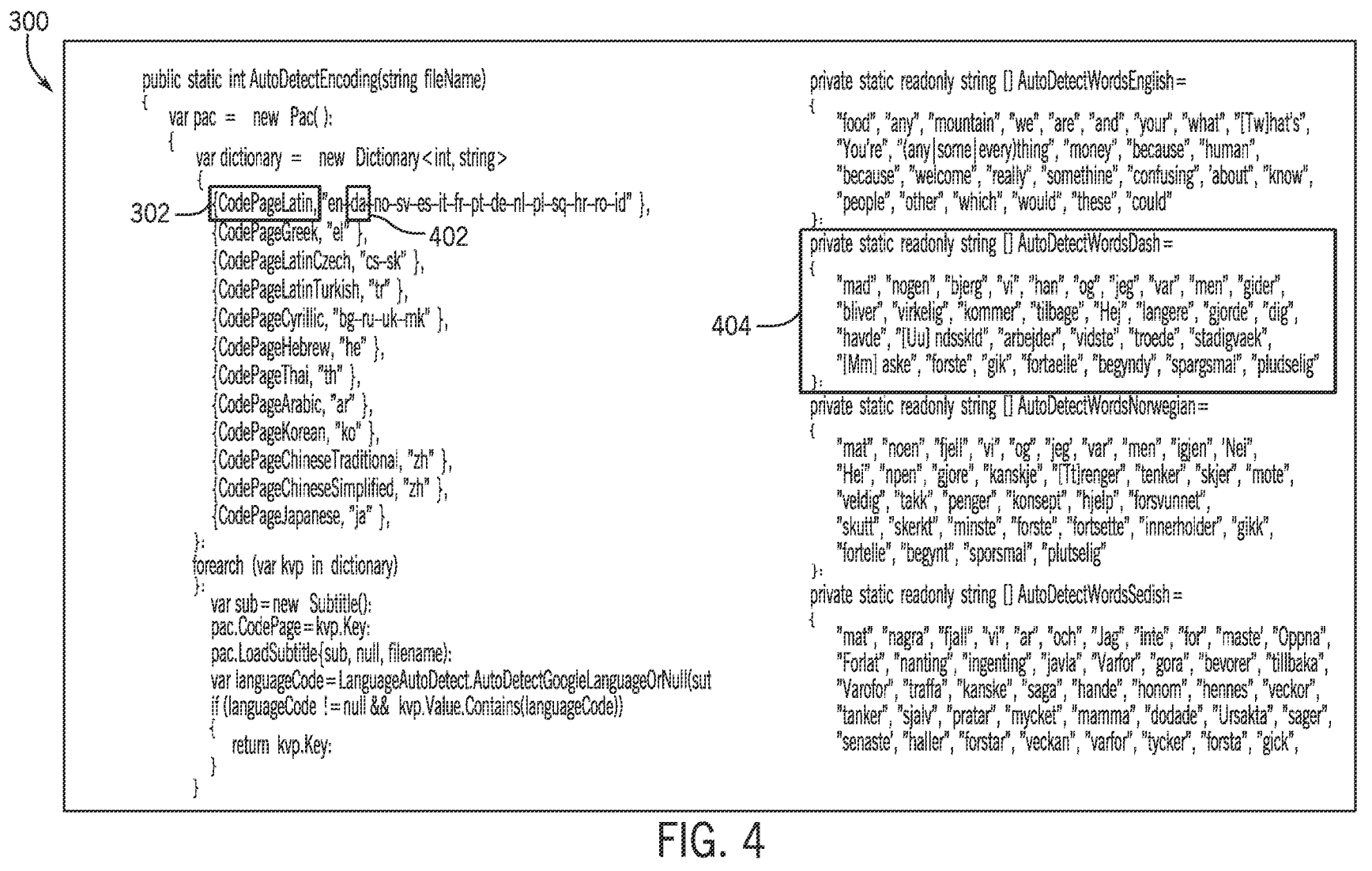

```
public static int AutoDetectEncoding(string fileName)
{
    var pac =  new  Pac( ):
    {
        var dictionary =  new  Dictionary<int, string>
        {
            {CodePageLatin, "en-da-no-sv-es-it-fr-pt-de-nl-pl-sq-hr-ro-id" },
            {CodePageGreek, "el" },
            {CodePageLatinCzech, "cs-sk" },
            {CodePageLatinTurkish, "tr" },
            {CodePageCyrillic, "bg-ru-uk-mk" },
            {CodePageHebrew, "he" },
            {CodePageThai, "th" },
            {CodePageArabic, "ar" },
            {CodePageKorean, "ko" },
            {CodePageChineseTraditional, "zh" },
            {CodePageChineseSimplified, "zh" },
            {CodePageJapanese, "ja" },
        }:
        foreach  (var kvp  in  dictionary)
        }:
            var sub = new  Subtitle():
            pac.CodePage = kvp.Key:
            pac.LoadSubtitle(sub, null, filename):
            var languageCode = LanguageAutoDetect.AutoDetectGoogleLanguageOrNull(sut
            if (languageCode  != null &&  kvp.Value.Contains(languageCode))
            {
                return  kvp.Key:
            }
        }

private static readonly string [] AutoDetectWordsEnglish =
{
    "food", "any", "mountain", "we", "are", "and", "your", "what", "[Tw]hat's",
    "You're", "(any|some|every)thing", "money", "because", "human",
    "because", "welcome", "really", "somethine", "confusing", 'about", "know",
    "people", "other", "which", "would", "these", "could"
}:
private static readonly string [] AutoDetectWordsDash =
{
    "mad", "nogen", "bjerg", "vi", "han", "og", "jeg", "var", "men", "gider",
    "bliver", "virkelig", "kommer", "tilbage", "Hej", "langere", "gjorde", "dig",
    "havde", "[Uu] ndsskld", "arbejder", "vidste", "troede", "stadigvaek",
    "[Mm] aske", "forste", "gik", "fortaelle", "begyndy", "spargsmal", "pludselig"
}:
private static readonly string [] AutoDetectWordsNorwegian =
{
    "mat", "noen", "fjell", "vi", "og", "jeg", "var", "men", "igjen", 'Nei",
    "Hei", "npen", "gjore", "kanskje", "[Tt]renger", "tenker", "skjer", "mote",
    "veldig", "takk", "penger", "konsept", "hjelp", "forsvunnet",
    "skutt", "skerkt", "minste", "forste", "fortsette", "innerholder", "gikk",
    "fortelle", "begynt", "sporsmal", "plutselig"
}:
private static readonly string [] AutoDetectWordsSedish =
{
    "mat", "nagra", "fjall", "vi", "ar", "och", "Jag", "inte", "for", "maste', "Oppna",
    "Forlat", "nanting", "ingenting", "javla", "Varfor", "gora", "bevorer", "tillbaka",
    "Varofor", "traffa", "kanske", "saga", "hande", "honom", "hennes", "veckor",
    "tanker", "sjalv", "pratar", "mycket", "mamma", "dodade", "Ursakta", "sager",
    "senaste', "haller", "forstar", "veckan", "varfor", "tycker", "forsta", "gick",
```

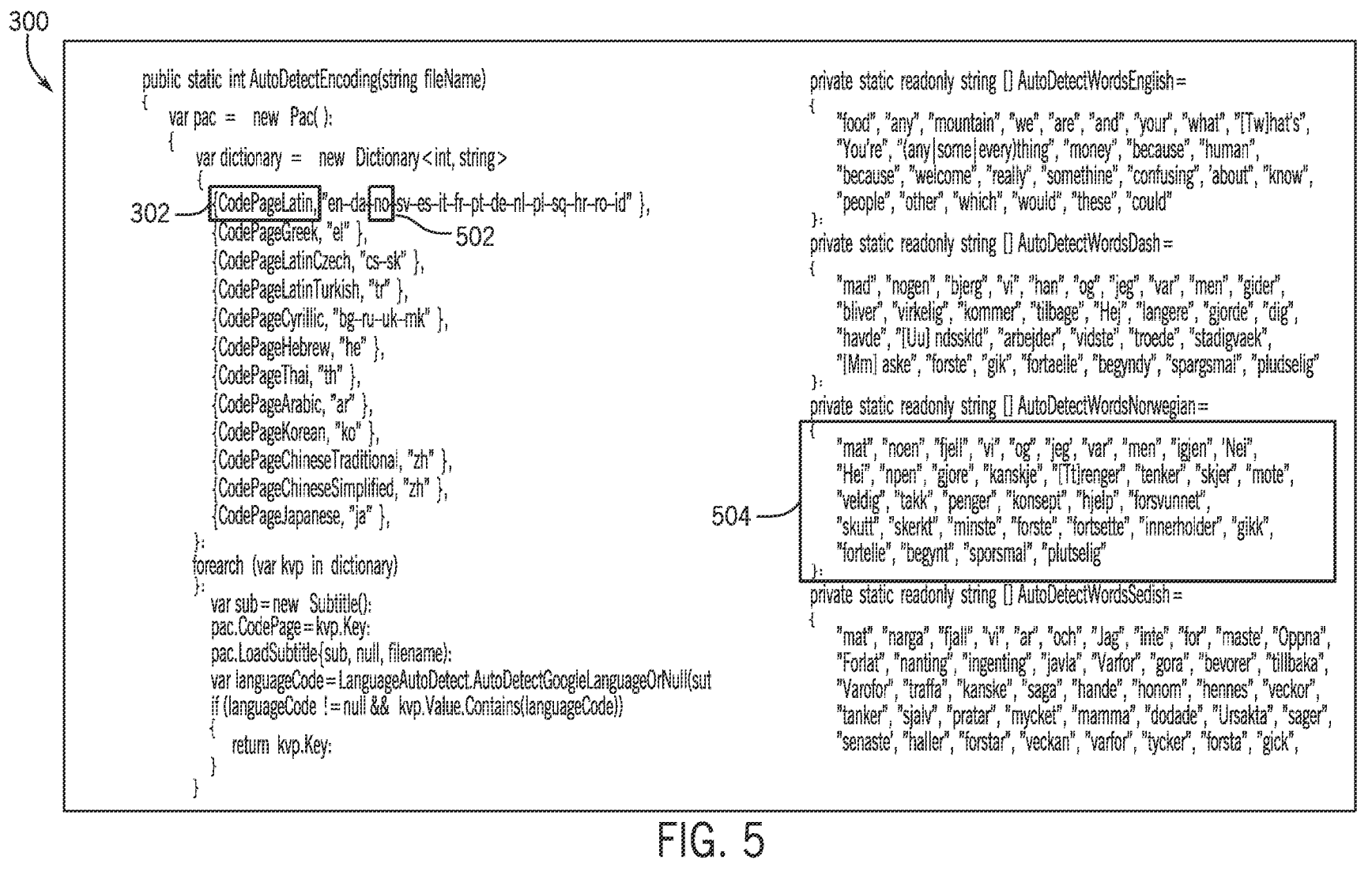

```
public static int AutoDetectEncoding(string fileName)
{
    var pac =   new  Pac( ):
    {
        var dictionary =   new  Dictionary<int, string>
        {
302 ——   {CodePageLatin, "en-da-no-sv-es-it-fr-pt-de-nl-pl-sq-hr-ro-id" },  —— 502
          {CodePageGreek, "el" },
          {CodePageLatinCzech, "cs-sk" },
          {CodePageLatinTurkish, "tr" },
          {CodePageCyrillic, "bg-ru-uk-mk" },
          {CodePageHebrew, "he" },
          {CodePageThai, "th" },
          {CodePageArabic, "ar" },
          {CodePageKorean, "ko" },
          {CodePageChineseTraditional, "zh" },
          {CodePageChineseSimplified, "zh" },
          {CodePageJapanese, "ja" },
        }:
        foreach  (var kvp  in  dictionary)
        }:
          var sub = new  Subtitle():
          pac.CodePage = kvp.Key:
          pac.LoadSubtitle(sub, null, filename):
          var languageCode = LanguageAutoDetect.AutoDetectGoogleLanguageOrNull(sut
          if (languageCode  != null &&  kvp.Value.Contains(languageCode))
          {
              return  kvp.Key:
          }
        }

private static readonly string [] AutoDetectWordsEnglish =
{
    "food", "any", "mountain", "we", "are", "and", "your", "what", "[Tw]hat's",
    "You're", "(any|some|every)thing", "money", "because", "human",
    "because", "welcome", "really", "somethine", "confusing", 'about", "know",
    "people", "other", "which", "would", "these", "could"
}:
private static readonly string [] AutoDetectWordsDash =
{
    "mad", "nogen", "bjerg", "vi", "han", "og", "jeg", "var", "men", "gider",
    "bliver", "virkelig", "kommer", "tilbage", "Hej", "langere", "gjorde", "dig",
    "havde", "[Uu] ndsskld", "arbejder", "vidste", "troede", "stadigvaek",
    "[Mm] aske", "forste", "gik", "fortaelle", "begyndy", "spargsmal", "pludselig"
}:
private static readonly string [] AutoDetectWordsNorwegian =
{
    "mat", "noen", "fjell", "vi", "og", "jeg", "var", "men", "igjen", 'Nei",
    "Hei", "npen", "gjore", "kanskje", "[Tt]renger", "tenker", "skjer", "mote",
    "veldig", "takk", "penger", "konsept", "hjelp", "forsvunnet",
    "skutt", "skerkt", "minste", "forste", "fortsette", "innerholder", "gikk",
    "fortelle", "begynt", "sporsmal", "plutselig"
}:                                                                  —— 504
private static readonly string [] AutoDetectWordsSedish =
{
    "mat", "narga", "fjall", "vi", "ar", "och", "Jag", "inte", "for", "maste', "Oppna",
    "Forlat", "nanting", "ingenting", "javla", "Varfor", "gora", "bevorer", "tillbaka",
    "Varofor", "traffa", "kanske", "saga", "hande", "honom", "hennes", "veckor",
    "tanker", "sjalv", "pratar", "mycket", "mamma", "dodade", "Ursakta", "sager",
    "senaste', "haller", "forstar", "veckan", "varfor", "tycker", "forsta", "gick",
```

FIG. 5

- ARABIC
- BULGARIAN
- CHINESE
- MANDARIN TRADITIONAL
- MANDARIN SIMPLIFIED (SINGAPORE)
- MANDARIN
- MANDARIN SIMPLIFIED
- KOREAN
- THAI
- VIETNAMESE

1002 — Perfect Day Nothing's standing in my way. It's a perfect day When nothing can go wrong (MUSIC FADES.) Hey. Hi. Try that one. OK. Emily. YES? Come here. They haven't called our number yet. I know. Relax, Agent Fornell. She's fine. I didn't expect to see you again until 2067. I got a reprieve.

1004 — Das bin ich, Red. Seit ich klein war, gehörte ich nicht dazu. Es scheint hier ein wiederkerendes Problem zu geben. Wut. Ist dir klar, dass du mit dem Umhang niemanden tauschen kannst? Ich spiele Red. Er ist ein Außenseiter auf Bird Island. Wahrscheinlich, weil er immer rot ist. Eine aggressive Farbe. Darf das wahr sein?

1006 — Estamos siguiendo una primicia de la costa oeste. La serie de apagones inexplicables en Los Angeles se intensifico. Y los funcionarios siguen sin saber cual es la causa. Los apagones se hicieron mas extensos y frecuentes. Necesitamos a todos en esto.¿Cuando puesdes llegar aqual?–¿Agente Strickland?

1008 — Je vais aller voir un psy. Sale petite garce moralisatrice!–Tu vas faire quoi?–Prendre un vibro. Espece de cinglee. JADE CATTA–PRETA Stresse pour Halloween Adieu, Ray. Je vais devenir Keith. A tout de suite, Keith! Oh, la vache ! Et voila Keith. C'est pas vrai ! Fais un bisou a papa. Fais un calin a papa. Je t'en prie, entre.

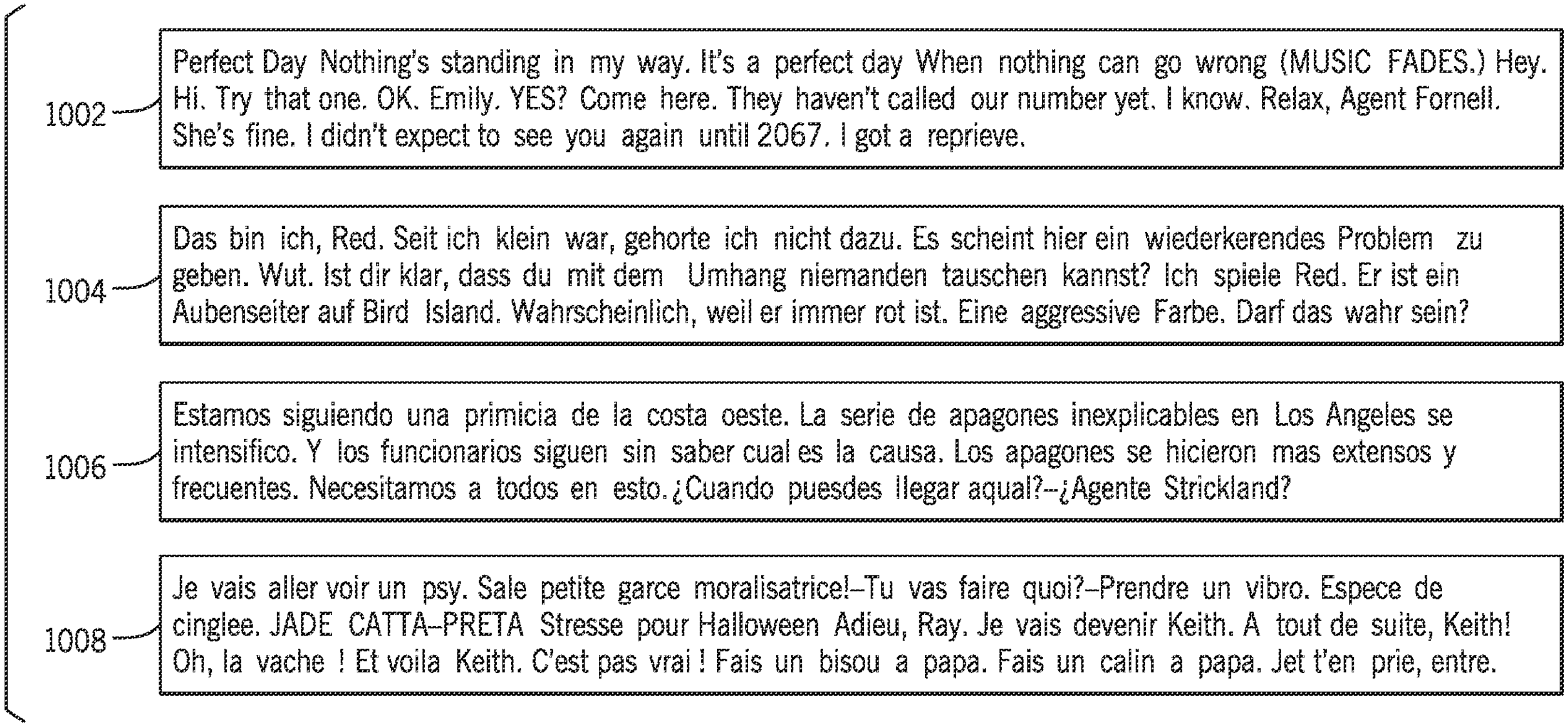

FIG. 10

1204 DOCUMENT FREQUENCY

| | | | | | | | | | |
|---|---|---|---|---|---|---|---|---|---|
| 80 101 | EN | 99 116 | EN | 121 10 | EN | 104 105 | EN | 115 32 | EN |
| 101 114 | EN | 116 32 | EN | 10 78 | EN | 105 110 | EN | 32 115 | EN |
| 114 102 | EN | 32 68 | EN | 78 111 | EN | 110 103 | EN | 115 116 | EN |
| 102 101 | EN | 68 97 | EN | 111 116 | EN | 103 39 | EN | 116 97 | EN |
| 101 99 | EN | 97 121 | EN | 116 104 | EN | 39 115 | EN | 97 110 | EN |

1206 ENGLISH TERM FREQUENCY

| | | | | | | | | | |
|---|---|---|---|---|---|---|---|---|---|
| 80 101 | 14 | 99 116 | 67 | 121 10 | 15 | 104 105 | 7 | 115 32 | 101 |
| 101 114 | 11 | 116 32 | 9 | 10 78 | 14 | 105 110 | 25 | 32 115 | 96 |
| 114 102 | 27 | 32 68 | 78 | 78 111 | 63 | 110 103 | 22 | 115 116 | 58 |
| 102 101 | 12 | 68 97 | 8 | 111 116 | 68 | 103 39 | 22 | 116 97 | 14 |
| 101 99 | 114 | 97 121 | 52 | 116 104 | 9 | 39 115 | 19 | 97 110 | 8 |

FIG. 14

1204 DOCUMENT FREQUENCY 1506

| | | | | | | | | | |
|---|---|---|---|---|---|---|---|---|---|
| 80 101 | EN | 99 116 | EN | 121 10 | EN | 104 105 | EN | 115 32 | EN |
| 101 114 | EN | 116 32 | EN | 10 78 | EN | 105 110 | EN | 32 115 | EN |
| 114 102 | EN | 32 68 | EN | 78 111 | EN | 110 103 | EN | 115 116 | EN |
| 102 101 | EN | 68 97 | EN, DE | 111 116 | EN | 103 39 | EN | 116 97 | EN |
| 101 99 | EN | 97 121 | EN | 116 104 | EN | 39 115 | EN | 97 110 | EN |

1208

1504 GERMAN TERM FREQUENCY

| | | | | | | | | | |
|---|---|---|---|---|---|---|---|---|---|
| 68 97 | 1 | | | | | | | | |
| | | | | | | | | | |
| | | | | | | | | | |
| | | | | | | | | | |
| | | | | | | | | | |

1502 GERMAN DOCUMENT 68 97 115 32 98 105 110 32 105 99 104 44 32 82 101 100 46 32 83 101 105 116 32 105 99 104 32 107 108 101
105 110 32 119 97 114 44 10 103 101 104 195 182 114 116 101 32 105 99 104 32 110 105 99 104 116 32 100
97 122 117 46 10 69 115 32 115 99 104 101 105 110 116 32 104 105 101 114 32 101 105 110 32 119 105 101

1204 DOCUMENT FREQUENCY

| | | | | | | | | | |
|---|---|---|---|---|---|---|---|---|---|
| 80 101 | EN | 99 116 | EN | 121 10 | EN | 104 105 | EN | 115 32 | EN |
| 101 114 | EN | 116 32 | EN | 10 78 | EN | 105 110 | EN | 32 115 | EN |
| 114 102 | EN | 32 68 | EN | 78 111 | EN | 110 103 | EN | 115 116 | EN |
| 102 101 | EN | 68 97 | EN, DE | 111 116 | EN | 103 39 | EN | 116 97 | EN |
| 101 99 | EN | 97 121 | EN | 116 104 | EN | 39 115 | EN | 97 110 | EN |

1504 GERMAN TERM FREQUENCY

| | | | | | | | | | |
|---|---|---|---|---|---|---|---|---|---|
| 68 97 | 1 | | | | | | | | |
| 97 115 | 1 | | | | | | | | |
| | | | | | | | | | |
| | | | | | | | | | |
| | | | | | | | | | |

1602 GERMAN DOCUMENT 68 97 115 32 98 105 110 32 105 99 104 44 32 82 101 100 46 32 83 101 105 116 32 105 99 104 32 107 108 101
105 110 32 119 97 114 44 10 103 101 104 195 182 114 116 101 32 105 99 104 32 110 105 99 104 116 32 100
97 122 117 46 10 69 115 32 115 99 104 101 105 110 116 32 104 105 101 114 32 101 105 110 32 119 105 101

1204 DOCUMENT FREQUENCY 1202, 1302, 1702, 1208, 1704, 1506

| | | | | | | | | | |
|---|---|---|---|---|---|---|---|---|---|
| 80 101 | EN, ER | 99 116 | EN, DE, FR, ES | 121 10 | EN, DE, FR, ES | 104 105 | EN, DE | 115 32 | EN, DE, FR, ES |
| 101 114 | EN, DE, FR, ES | 116 32 | EN, DE, FR, ES | 10 78 | EN, DE, FR, ES | 105 110 | EN, FR | 32 115 | EN, |
| 114 102 | EN, DE, FR, ES | 32 68 | EN, ES | 78 111 | EN, DE, FR, ES | 110 103 | EN | 115 116 | EN, DE, FR, ES |
| 102 101 | EN, DE, ES | 68 97 | EN, DE | 111 116 | EN, DE, FR, ES | 103 39 | EN, FR, ES | 116 97 | EN, ES |
| 101 99 | EN, | 97 121 | EN, ES | 116 104 | EN, DE | 39 115 | EN, DE, FR, ES | 97 110 | EN, DE, FR, ES |

FIG. 17

Figure 19:
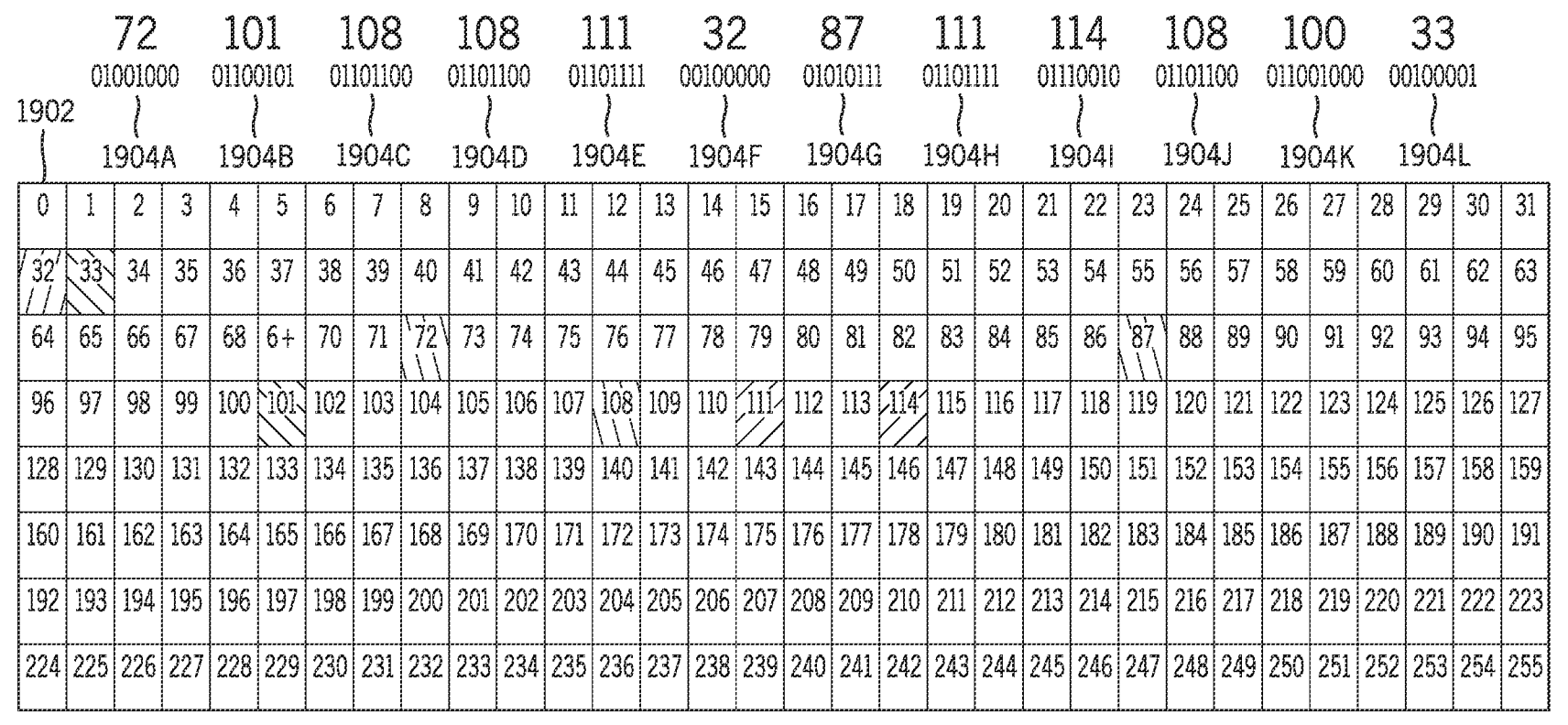

| 1902 | 72 01001000 1904A | | | 101 01100101 1904B | | 108 01101100 1904C | | | 108 01101100 1904D | | 111 01101111 1904E | | | 32 00100000 1904F | | 87 01010111 1904G | | | 111 01101111 1904H | | 114 01110010 1904I | | | 108 01101100 1904J | | 100 01100100 1904K | | | 33 00100001 1904L | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| 64 | 65 | 66 | 67 | 68 | 6+ | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 | 249 | 250 | 251 | 252 | 253 | 254 | 255 |

| | BYTE SEQUENCES (2302) | TERM (USING LATIN WRITING SYSTEM LUT) (2304) | TF SCORE FRENCH (CAJUN) (2306) | TF SCORE SPANISH (2308) | TF SCORE FRENCH (PROPER) (2310) | TF SCORE KOREAN (2312) |
|---|---|---|---|---|---|---|
| 2302A | 01000011; 01101000 | CH | 500 | 455 | 500 | 20 |
| 2302B | 01000011; 01101000; 01100101 | CHE | 425 | 298 | 401 | 3 |
| 2302C | 01000011; 01101000; 01100101; 01110010 | CHER | 400 | 54 | 125 | 0 |

FIG. 23

SYSTEMS AND METHODS FOR LANGUAGE IDENTIFICATION IN BINARY FILE FORMATS

BACKGROUND

The present disclosure generally relates to decoding encoded files. More particularly, the present disclosure relates to systems and process for determining the underlying language of a file encoded in certain binary file formats.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein relate to decoding encoded files. More particularly, the present disclosure relates to systems and processes for determining the underlying language of encoded files having certain file formats with undeterminable encoding mechanisms. If the language is not identified for the files with undeterminable encodings, it may be difficult, time consuming, and costly to decode the files. Embodiments disclosed herein relate to determining the underlying language of the files by analyzing bit sequences in the encoded file and comparing the bit sequences against accumulated training data to determine matching patterns between the bit sequences in the file and the bit sequences known correspond to terms associated with a particular language.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is an exemplary list of potential languages in which the file may be encoded, in accordance with an embodiment of the present disclosure;

FIG. 3 is an exemplary illustration of a stage of operation of the LID service, in accordance with an embodiment of the present disclosure;

FIG. 4 is an exemplary illustration of another stage of operation of the LID service, in accordance with an embodiment of the present disclosure;

FIG. 5 is an exemplary illustration of yet another stage of operation of the LID service, in accordance with an embodiment of the present disclosure;

FIG. 10 is an example of documents having known language that may be used as training documents for the TF-IDF engine, in accordance with an embodiment of the present disclosure;

FIG. 14 illustrates the training data results after the training algorithm has analyzed multiple English language training documents, in accordance with an embodiment of the present disclosure;

FIG. 15 illustrates training data results after analyzing a first term of a second training document of FIG. 12, in accordance with an embodiment of the present disclosure;

FIG. 16 illustrates training data results after analyzing a second term of the second training document of FIG. 15, in accordance with an embodiment of the present disclosure;

FIG. 17 illustrates training data results in a document frequency table after a training algorithm has analyzed training documents in several languages, in accordance with an embodiment of the present disclosure;

FIG. 19 illustrates mapping bytes of a query file to an entry of a lookup table (LUT) to identify a term in the query file, in accordance with an embodiment of the present disclosure;

FIG. 23 is a table illustrating TF results for a number of terms as applied to a number of potential languages, in accordance with an embodiment of the present disclosure.

DETAILED DESCRIPTION

Figure 1:
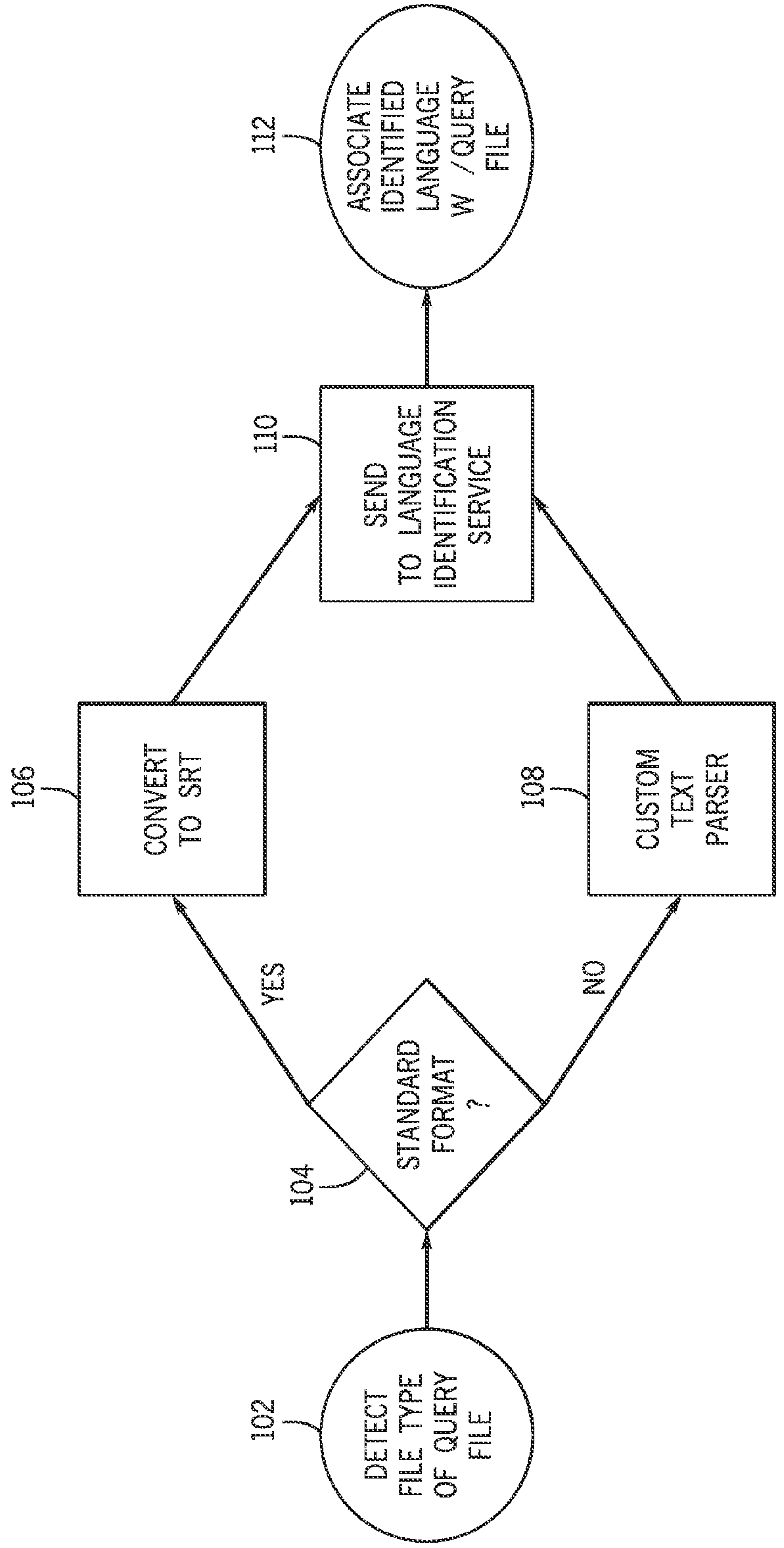
FIG. 1 is a flow diagram illustrating an example process for determining a language present in a file, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As discussed in greater detail below, the present embodiments described herein facilitate and improve decoding of files having certain file formats (e.g., file formats where encoded values can represent different data depending on a language represented in the file, where a language may not be specified). In an encoded binary file (e.g., raw computer file has not been decoded to text), each binary string (e.g., an 8-bit binary string, or byte) may correspond to a character of the language. Each language (e.g., English, Russian, and so on) or writing system (e.g., Latin, Cyrillic, and so on) may have a map or lookup table (LUT) in which a string of bits (e.g., one byte) corresponds to a character of the corresponding writing system. For example, an English encoding may include bytes of data which represent a character (e.g., a number, punctuation mark, or letter of the Latin alphabet). For example, in an English encoding, the byte 01001000 (i.e., 72 in decimal) may correspond to the letter "H", while the byte 00100001 (i.e., 33 in decimal) may correspond to the punctuation "!". However, in the certain file formats, each language may have a different encoding. For example, if each language has a different encoding. 01001000 may be "H" in English, but may be a different character in Spanish and French. For other non-standard file formats, each writing system (e.g., Latin, Cyrillic) may have a different encoding while the languages in the writing system (e.g., English, Spanish, French, and any other language which uses the Latin writing system) may share an encoding. For example, 01001000 may be "H" in English, Spanish, and French, but may be a different character in Russian, Korean, Greek, and any other languages that use a non-Latin alphabet. Due to this variance, it may be extremely difficult or impossible to decode a file with an undeterminable file format or having certain encoded file formats where diverging values may be discerned during decoding (e.g., based upon language differences represented in the file). Such file formats may include or may be discussed as non-standard binary file format, which is not intended to limit the technique to binary encoding of files but is merely provided as one type of encoding scheme for explanatory purposes. Indeed, in some embodiments a similar technique could be used in other encoding schemes, such as a scheme where the encoding is represented by base-16 (hexadecimal) encoded values.

As such, embodiments herein disclose a process and system for determining the language of a file having an undeterminable encoding or a non-standard encoded file format (e.g., a non-standard binary file format). A system may receive a query file (e.g., a file with undeterminable encoding in which the underlying encoded language is unknown) and determine the query file includes a non-standard encoded file format. The system may analyze one or more sequences of bits or bytes and may determine whether the sequences indicate the unknown language of the query file. As previously stated, each sequence of bits (e.g., byte or sequence of bytes) may correspond to a character or sequence of characters in a particular language (e.g., for a Latin writing system encoding, 01001000 may correspond to the letter "H"). By comparing a variety of sequences of bytes from the query file against a library training data, the language in the query file may be identified with a high degree of accuracy. For example, a software application (e.g., a machine learning algorithm) may analyze several text documents including several different identified languages. The algorithm may analyze the encoded binary format of the text files, and store "terms" (e.g., bit sequences, such as a sequence of bytes) identified for each language. More specifically, a term is a sequence of characters that each correspond to the sequences of bytes. Based on analyzing a sufficiently large sample of documents of different languages, the algorithm may identify certain terms (letters, words, portions of words, or other characters) that indicate strong correlation to a specific language. For example, French vocabularies contain many words with "eau" and "oi" letter sequences, while Norwegian vocabularies contain few words with such letter sequences. Thus, when analyzing the query file, the algorithm may detect a high frequency of terms (i.e., a sequence of bytes) corresponding to "eau" and "oi." Based on this, the algorithm may apply a high score to French (e.g., indicating a greater likelihood of French being the underlying language of the query file) and may apply a low score to Norwegian (e.g., indicating a lesser likelihood of Norwegian being the underlying language of the query file).

The score may be determined by performing a term frequency (TF) calculation and an inverse-document frequency (IDF) calculation on the terms in the query file. In this case, the TF calculation is a measure of how often the term occurs in a specific language. Returning to the previous example, French may have a high TF score and Norwegian may have a low TF score for the terms "eau" and "oi." The IDF calculation is a measure of the uniqueness of a term to a particular language. For example, the term "en" may have a high TF score for French, but also may have a high TF score for English, Spanish, German, and Norwegian. Thus "en" may be assigned a low IDF score, as it may be too common to be useful in identifying the language of the query file. The terms "eau" and "oi" may have high TF score and high IDF score for French, and thus the algorithm may a greater cumulative score to French. After analyzing the terms in the query file, the algorithm may assign a cumulative score to each potential language, and may automatically identify the language with the highest cumulative score as the language of the query file, or may provide the results of the analysis for manual selection of a language by a user.

With the foregoing in mind, FIG. 1 is a flow diagram illustrating an example process 100 of determining a language present in a file, according to an embodiment of the disclosure. Such a process may be useful in decoding file formats that may be expected by downstream processes. In process block 102, an algorithm may detect a file type of a query file. The file may include subtitles or captions for a particular media (e.g., the subtitles for a movie or television program). If an entity acquires a library of files including captions and/or subtitles, they may wish to decode the files in order to access and display the text within the files. In query block 104 of process 100, it is determined whether the file type detected in process block 102 is encoded in a standard format. A standard format may be well-known, and thus it may be simple to decode the query file. If the file is encoded with a standard format, the query file may be converted to a particular format (e.g., a SubRip Subtitle (SRT) file format) that may be expected by downstream processes. As described herein, the process will be described as using the SRT file format, but this is not intended to limit the process to use of the SRT file format, indeed other file formats (e.g., plain text file formats, such as TXT files) could be used. An SRT file is a plain-text file that may include information regarding subtitles and timing; such as the start timecode and the end timecode of a portion of text to ensure the subtitles match the audio of the associated media.

However, if it is determined that the file type is encoded in a non-standard format, in process block 108 the file may be sent to a custom text parser to decode the query file. The custom text parser may include custom code, specific to the non-standard format, useful for decoding or otherwise converting the query file into a file format usable by downstream processes. Unfortunately, as will be described in detail below, sometimes the custom text parser code may be ineffective or present inaccuracy when additional information (e.g., a language of the query file) is used in the encoding scheme of the query file, as this information may affect a decoding scheme used and may not be present at the time of decoding/converting the query file. Additionally, these techniques may be ineffective when the query file has an undeterminable encoding. Thus, an enhanced process may be used in such situations, as discussed below.

Once the file is converted to SRT or run through a custom text parser, the resultant decoded/converted file may be sent to a language identification (LID) service (block 110). The LID service may determine the language of the decoded/converted file, which may then be associated with a query file. As may be appreciated, the process 100 may be used to efficiently determine a language of a query file. The process 100 may be utilized to discern languages of a multitude of file formats in a very efficient manner, while requiring very little human interaction.

While the process 100 provides an efficient mechanism for identifying languages of query files with an encoding that may be decoded in a standardized or custom (non-standardized) way regardless of the language of the decoded text (e.g., English, Russian, Mandarin, and so on), certain file formats (e.g., binary file formats such as a .pac file format) may not have a known, standard decoding that is universal for every supported language, or may have an undeterminable encoding. To convert files with these language-dependent encoded file formats or file formats with undeterminable encoding to text, the language must be known beforehand. To determine the language of the files, an alternative mechanism to the language identification (LID) services may be used, as the LID service may require a decoded/converted file to identify the language. For example, as will be described in more detail below, a Term Frequency-Inverse Document Frequency Engine may be used to identify a language of the query file without decoding/conversion of the query file.

In some embodiments, the LID service may attempt to identify the language without decoding/converting the file via a brute force mechanism. That is, the LID service may perform a variety of decoding schemes on the query file for each potential language, and attempt to determine the correct language based on the results of the variety of decoding schemes.

Figures 6, 7:
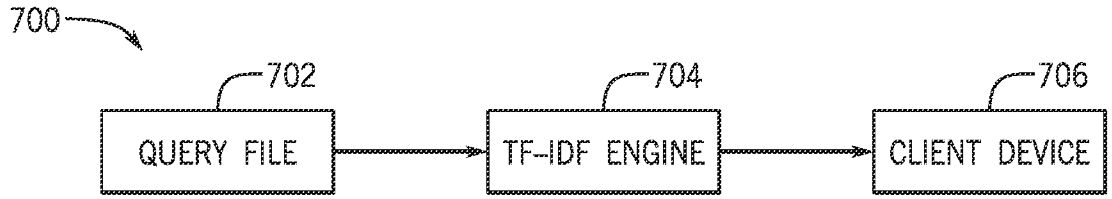
FIG. 6 is an exemplary list of languages that may be identified as potential languages of the query file by the LID service after applying various decoding schemes to a query file, in accordance with an embodiment of the present disclosure.
FIG. 7 is a flowchart of a process for determining the underlying language of the query file using term frequency and inverse document frequency (TF-IDF), in accordance with an embodiment of the present disclosure.

FIG. 2 is an exemplary list of potential languages in which the file may be encoded, according to an embodiment of the present disclosure. It may be appreciated that the list of languages represented in FIG. 2 is non-exhaustive. FIGS. 3-5 illustrate stages of a brute force implementation for identifying a language from the list of languages represented in FIG. 2. FIG. 6 is an exemplary list of languages that may be identified as potential languages of the query file by the LID service in the block 110 after applying various decoding schemes to the query file, according to an embodiment of the present disclosure.

Starting first with FIG. 2, a large list of potential languages of a language-dependent encoded query file may be available. Each of these languages many have an individual encoding/decoding scheme and/or sub-sets of the languages may have an individual encoding/decoding scheme. Accordingly, to create a brute force identification of the language for the query file, code is derived for each individual encoding/decoding scheme for each language and/or subset of languages.

FIG. 3 is an exemplary illustration of a stage of operation of the LID service, according to an embodiment of the present disclosure. The LID service may attempt to identify the underlying language of the query file by applying each available decoding scheme available to the LID service until the correct decoding scheme is identified. For example, the LID service may attempt to apply a Latin writing system decoding 302 to the query file; the Latin writing system decoding 302 applying decoding of a variety of Latin languages to the query file. For example, the Latin writing system decoding 302 may first apply an English identifying scheme 306 to the query file. The LID service may then determine if any English terms may be identified in the query file by the English identifying scheme 306. For example, an English dictionary of terms 304 may be defined. When one of the defined terms for the English dictionary of terms 304 is found in the query file (after the Latin writing system decoding 302), the identified language may be set to English. In some embodiments, the LID service may apply a score to the results of the English identifying scheme 306 and rank that score against the scores of other decoding schemes based upon the number of occurrences of terms of the English dictionary of terms 304 in the query file.

FIG. 4 is an exemplary illustration of another stage of operation of the LID service, according to an embodiment of the present disclosure. In FIG. 4, the LID service may apply a Danish identifying scheme 402 and, similarly to the English identifying scheme 306 in FIG. 3, determine if any Danish terms (e.g., as defined by the Danish Library of terms 404) may be identified in the query file by the Danish identifying scheme 402. Because the Danish language uses the same Latin character set, it is bundled with the same Latin writing system decoding 302 of FIG. 3. As mentioned above, the language of the query file may be identified as Danish if a Danish word is found in the query file and/or a score of the likelihood of the file being a Danish query file may be calculated based upon the number of occurrences of Danish terms from the Danish Library of terms 404 found in the query file.

FIG. 5 is an exemplary illustration of yet another stage of operation of the LID service, according to an embodiment of the present disclosure. In FIG. 5, the LID service may apply a Norwegian identifying scheme 502 and, similarly to the English identifying scheme 306 and the Danish identifying scheme 402, determine if any Norwegian terms of the Norwegian Library of terms 504 may be identified in the query file by the Norwegian decoding scheme 502. If a term is found, the language of the query file may be identified as Norwegian and/or a Norwegian likelihood score based upon a number of occurrences of Norwegian words may be calculated.

The LID service may continue to apply similar language identifying schemes corresponding to different languages to the query file and compare the results to determine the language of the query file. Furthermore, the decoding scheme may change for languages that use different decoding schemes (e.g., which may occur when a language uses a different alphabet (e.g., Latin vs. Greek)).

This brute force approach may have undesirable attributes. For one, the term libraries are static and do not provide a granular approach to identifying characteristics of a file that tend to indicate the file is a particular language. Instead, a static list of expected terms is derived and used as the identification characteristics. Exacerbating this problem, many of the languages include similar characteristics (e.g., similar terms and/or outputs representing different terms formed from different decoding schemes) that, when occurring, may indicate that the language. For example, FIG. 6 provides a subset of languages that oftentimes result in erroneous language identification based upon similar characteristics found in the language libraries.

Further, as mentioned above, the brute force mechanism may end when terms of a particular language identifying scheme are found. However, such approach may lead to erroneous results, as language identifying schemes executed first may be more likely chosen based upon executing earlier in the language identifying process. For example, in one implementation of the brute force approach, a Korean query file may be falsely indicated as Chinese-Simplified, when the Korean identifying scheme is run after the Chinese-Simplified identifying scheme, as the Korean query file, when decoded via the Chinese-Simplified decoding scheme, may have occurrences of terms from the Chinese-Simplified Library of Terms.

The likelihood scoring may help mitigate this, by first running the language identifying schemes for each language and then prioritizing likelihood based upon the scores. Based on the results of the various decoding schemes, the LID service may filter out the languages that have a sufficiently low probability of being the language of the query file. However, this approach may require a full analysis of the query file with respect to each and every language, which may be quite time consuming and processing intensive, requiring significant computer resources.

As may be appreciated from the discussion above, while using the LID service in a brute force manner may enable identifying the language of the query file, there may be several associated disadvantages. For example, the process of using the LID service may be lengthy and expensive, and in some cases may fail to return results sufficient to identify the language of the query file. Further, even if the LID service returns results indicating one or more potential languages of the query file, the results may include false positives (e.g., a decoding scheme may misinterpret one language as another).

To minimize or avoid the aforementioned disadvantages, an alternative language identification process may be employed that does not rely on extensive and iterative trial-and-error process using a significant number of decoding schemes. FIG. 7 is a system 700 for determining the underlying language of the query file 702 using term frequency and inverse document frequency (TF-IDF), according to an embodiment of the present disclosure. The TF-IDF engine 704 may receive the query file 702 with content of a particular language. As will be discussed in detail below, the TF-IDF engine 704 may be tasked to determine the language of the query file 702 by analyzing characteristics of the encoded contents within the query file, and output the results (e.g., potential language of the query file 702) to a client device 706. The language can be associated with the query file 702 and used by downstream components (e.g., for packaging of subtitles of a particular language (e.g., as requested by a client device) to content).

Figure 8:
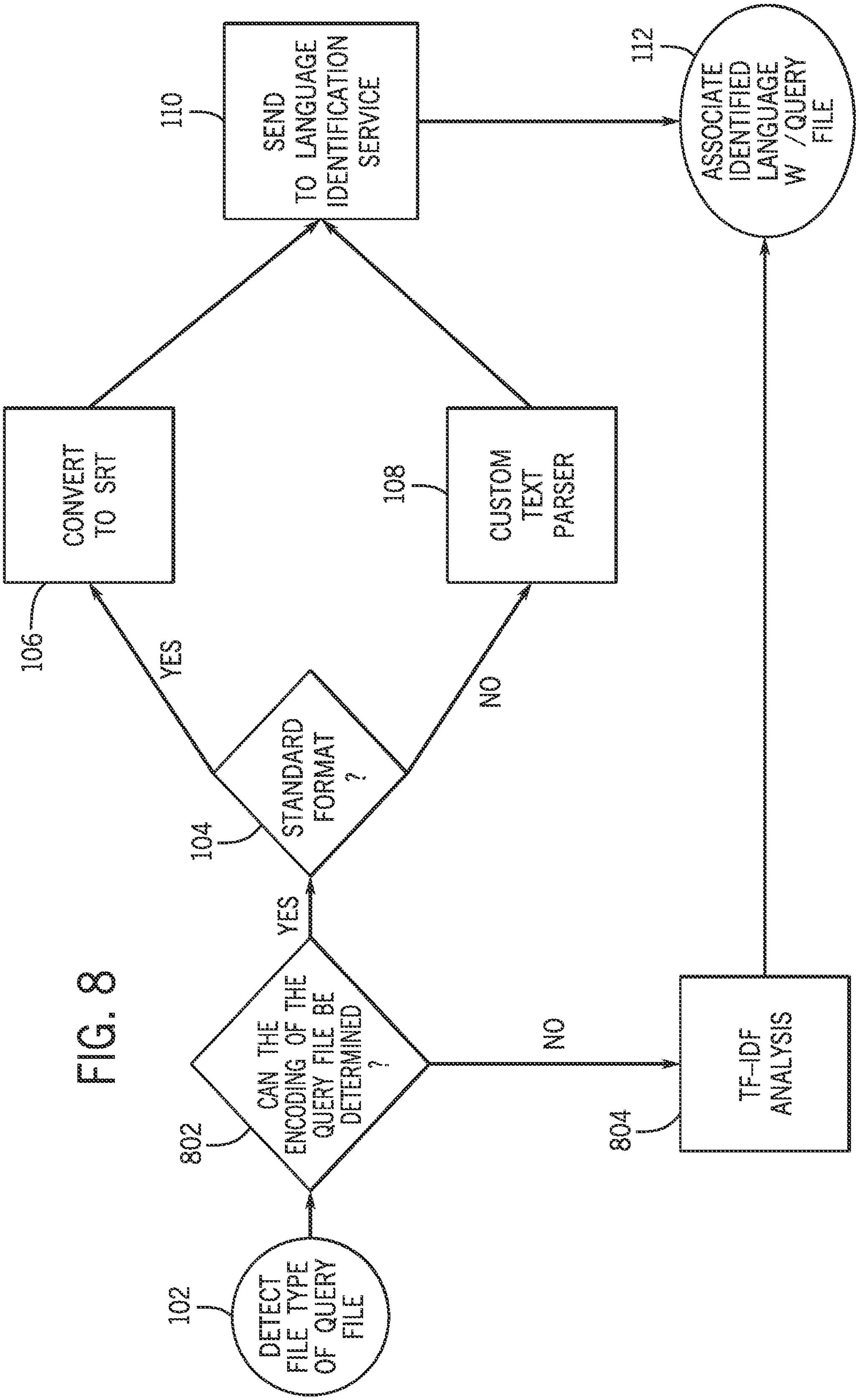
FIG. 8 is a diagram illustrating a system for implementing a term frequency-inverse document frequency (TF-IDF), in accordance with an embodiment of the present disclosure.

FIG. 8 is a diagram illustrating a process 800 for implementing a term frequency-inverse document frequency (TF-IDF) in conjunction with process 100 of FIG. 1, according to an embodiment of the present disclosure. Similar to FIG. 1, in process block 102, the file format of the query file 702 may be detected. In query block 802, it may be determined whether the query file includes a file format with an undeterminable encoding (e.g., a .pac file). If the query file is determined to have an encoding mechanism that can be determined, it may be determined whether the query file has a standard file format (e.g., in which case the query file may be converted to SRT) or has a nonstandard file format (e.g., in which case the query file may be passed to the custom text parser) and may proceed as discussed in FIG. 1. If the query file is determined to have an undeterminable encoding, the language of the query file may be needed to properly decode the query file. Accordingly, the TF-IDF analysis (e.g., via a TF-IDF engine 704) may determine the language of the query file using TF-IDF (block 804), as will be discussed in greater detail below.

Figure 9:
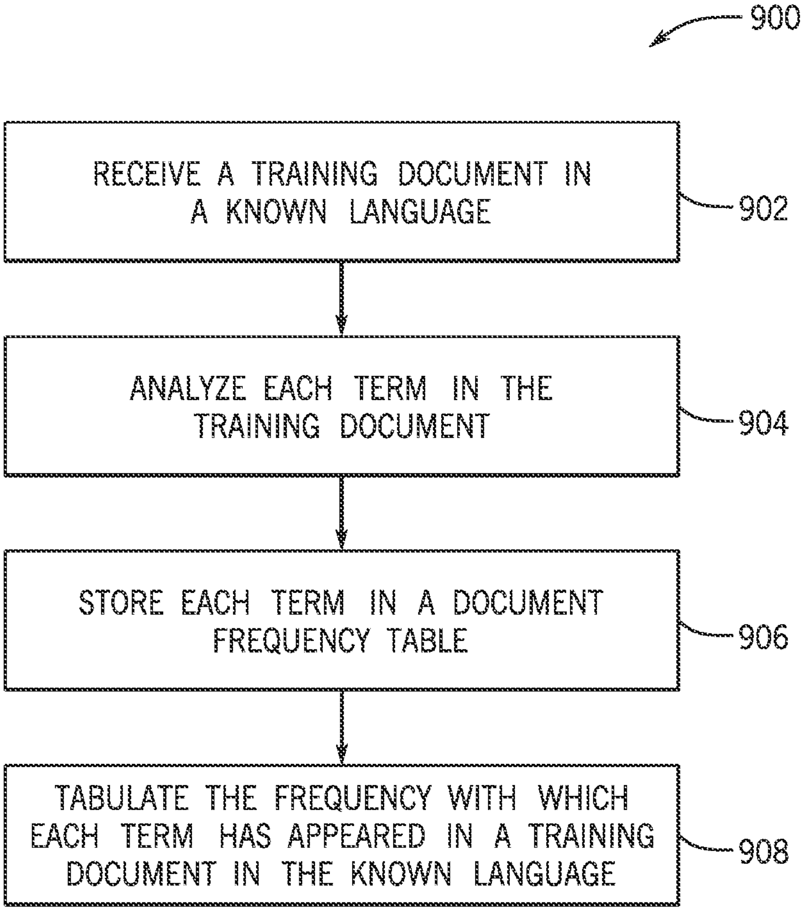
FIG. 9 is a flowchart of a process for obtaining training data for the TF-IDF engine, in accordance with an embodiment of the present disclosure.

Turning to the details of the processing tasks supporting the TF-IDF analysis, FIG. 9 is a flowchart of a process 900 for obtaining training data for the TF-IDF engine 704, according to an embodiment of the present disclosure. Any suitable device (e.g., a controller) that may control components of an electronic device, such as a processor, may perform the process 900. In some embodiments, the process 900 may be implemented by executing instructions stored in a tangible, non-transitory, computer-readable medium, such as memory or storage, using the processor. For example, the process 900 may be performed at least in part by one or more software components, such as an operating system of the electronic device, one or more software applications of the electronic device, and the like. While the process 900 is described using steps in a specific sequence, it should be understood that the present disclosure contemplates that the described steps may be performed in different sequences than the sequence illustrated, and certain described steps may be skipped or not performed altogether.

In process block 902, a training document having a known language is received. The training documents may be similar to the query files, in that they include language-specific content stored in a particular file format (e.g., binary encoded format). FIG. 10 is an example of documents having known language that may be used as training documents for the TF-IDF engine 704. Training document 1002 is an English training document; training document 1004 is a German training document; training document 1006 is a Spanish training document; and training document 1008 is a French training document.

Returning to FIG. 9, in process block 904, each term (e.g., combination of 2 or more sequential numerical values) that occurs in the training document may be analyzed to identify the term frequency of each term in the training document. As previously discussed, the query file may be in a binary encoded format. Thus, the training document may be analyzed in the binary encoded format. Other formats could alternatively be used to encode the query files. For example, a base-10 encoding.

Figure 11:
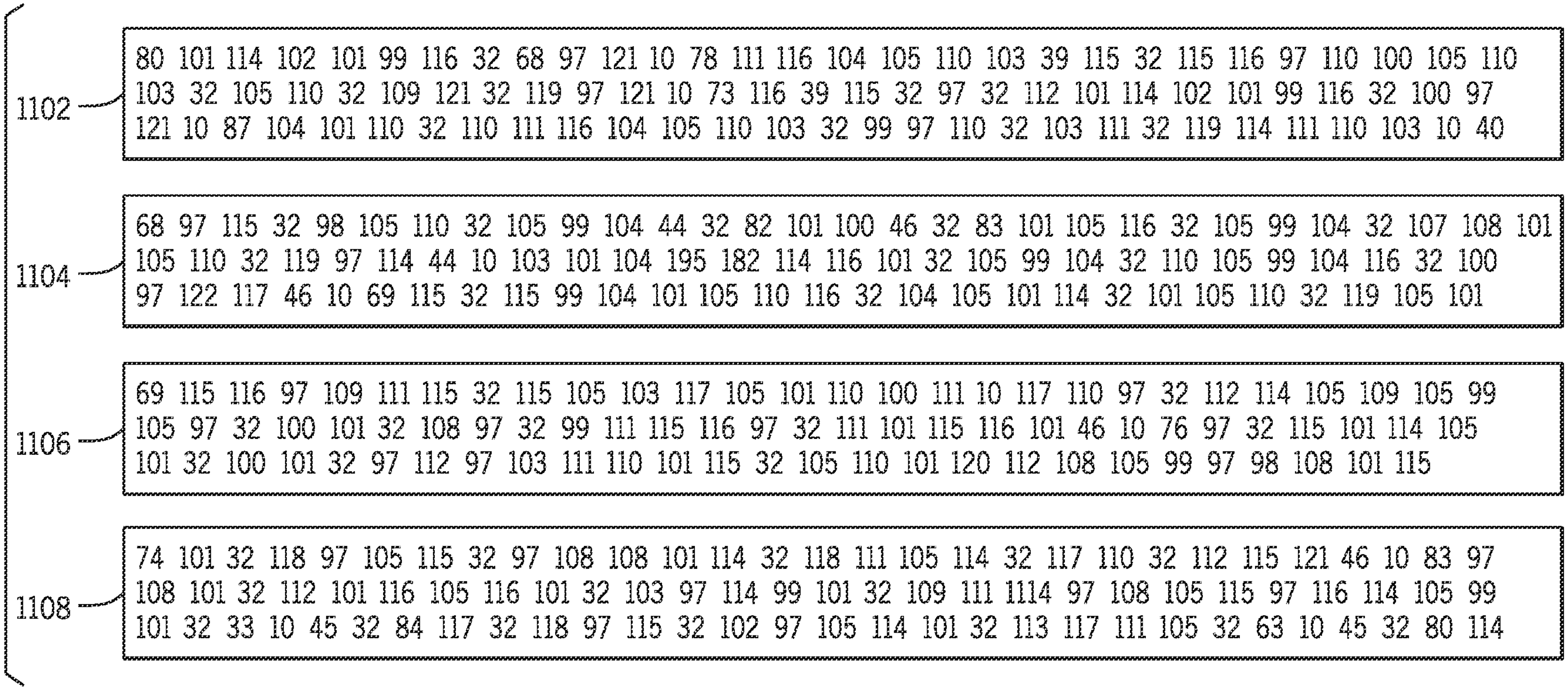
FIG. 11 is an illustration of the training documents converted to a numerical format, in accordance with an embodiment of the present disclosure.
Figure 20:
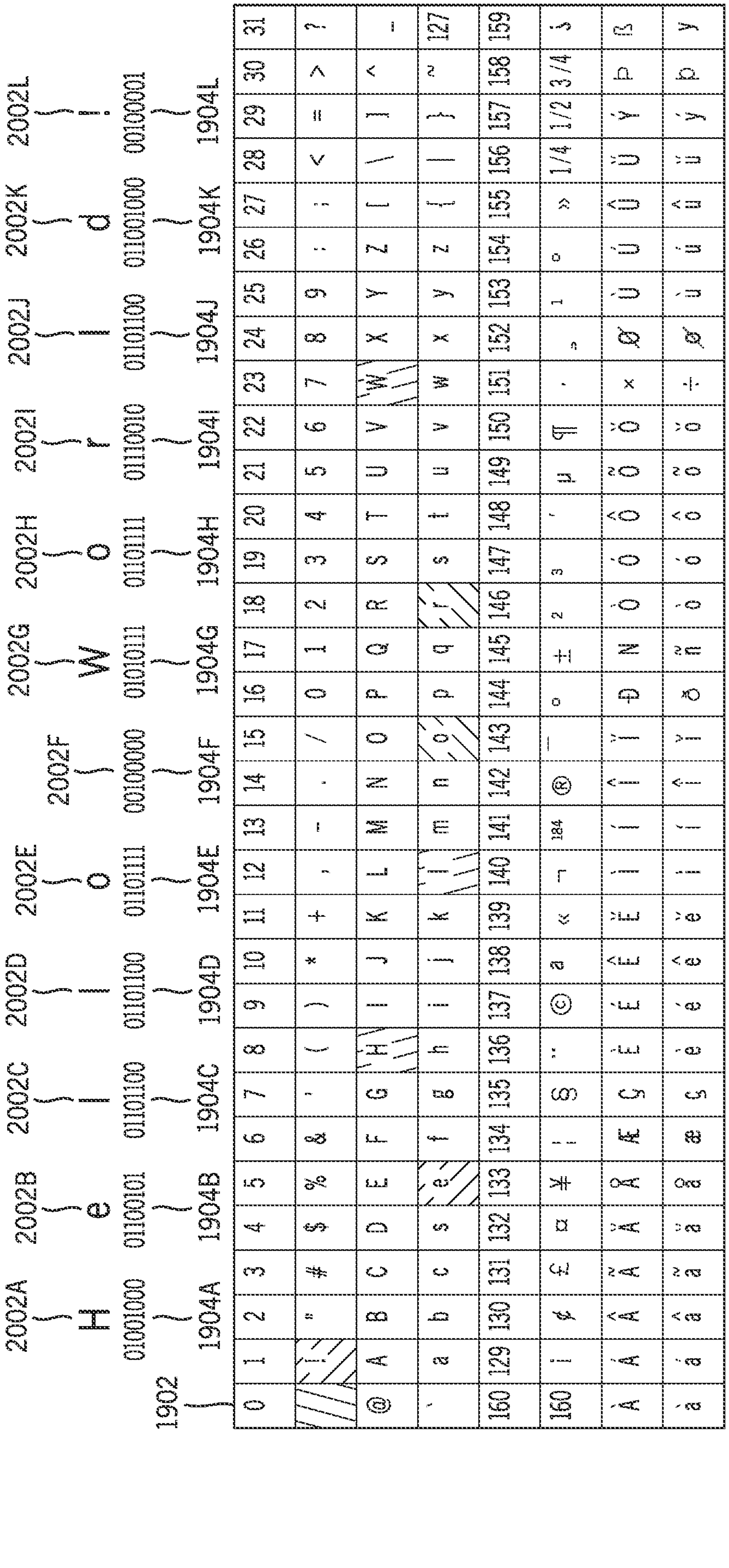
FIG. 20 illustrates generating English terms as the bytes sequences of FIG. 19 are mapped to an LUT corresponding to a Latin writing system, in accordance with an embodiment of the present disclosure.
Figure 21:
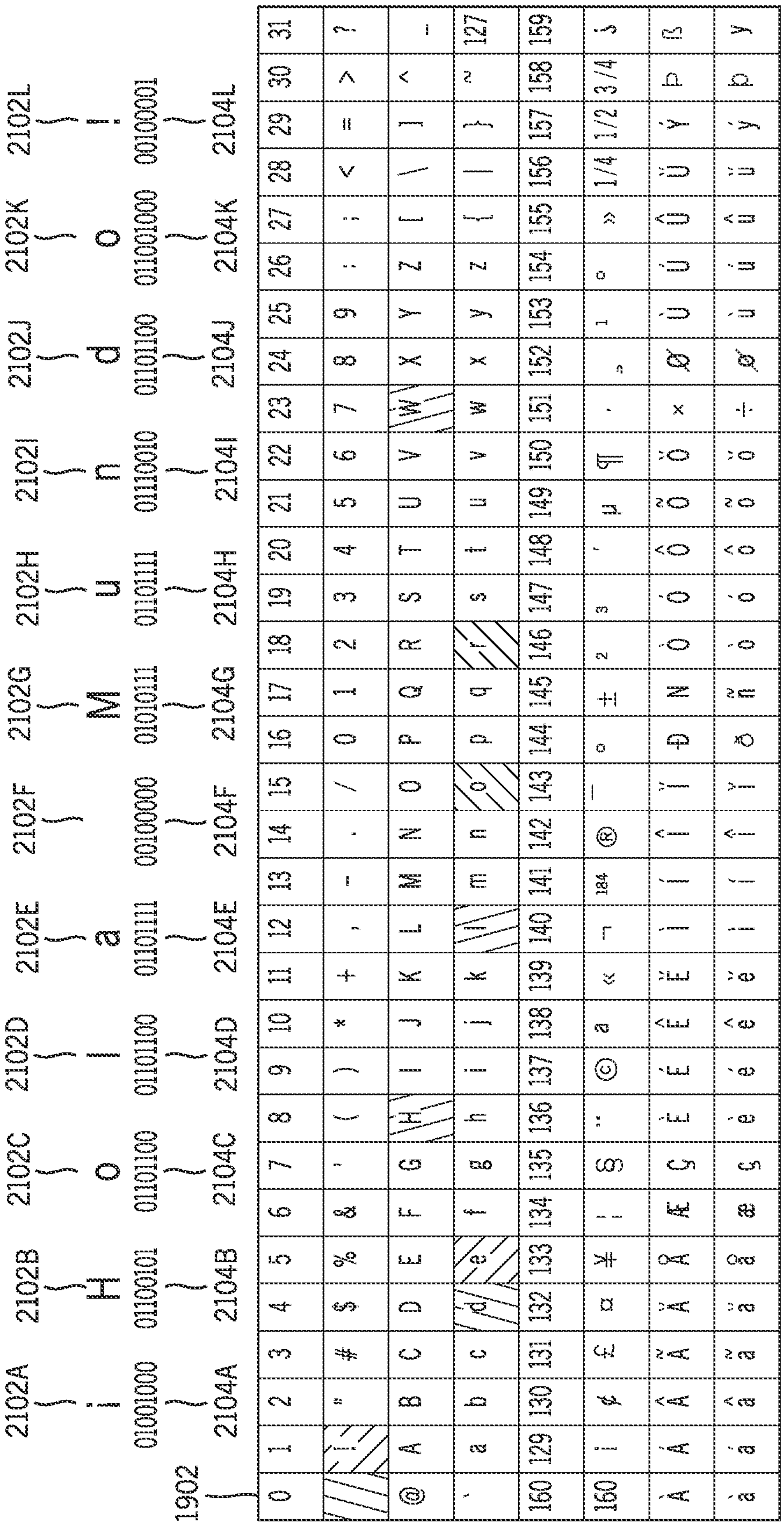
FIG. 21 illustrates generating Spanish terms by mapping byte sequences to the LUT of FIG. 20, in accordance with an embodiment of the present disclosure.
Figure 22:
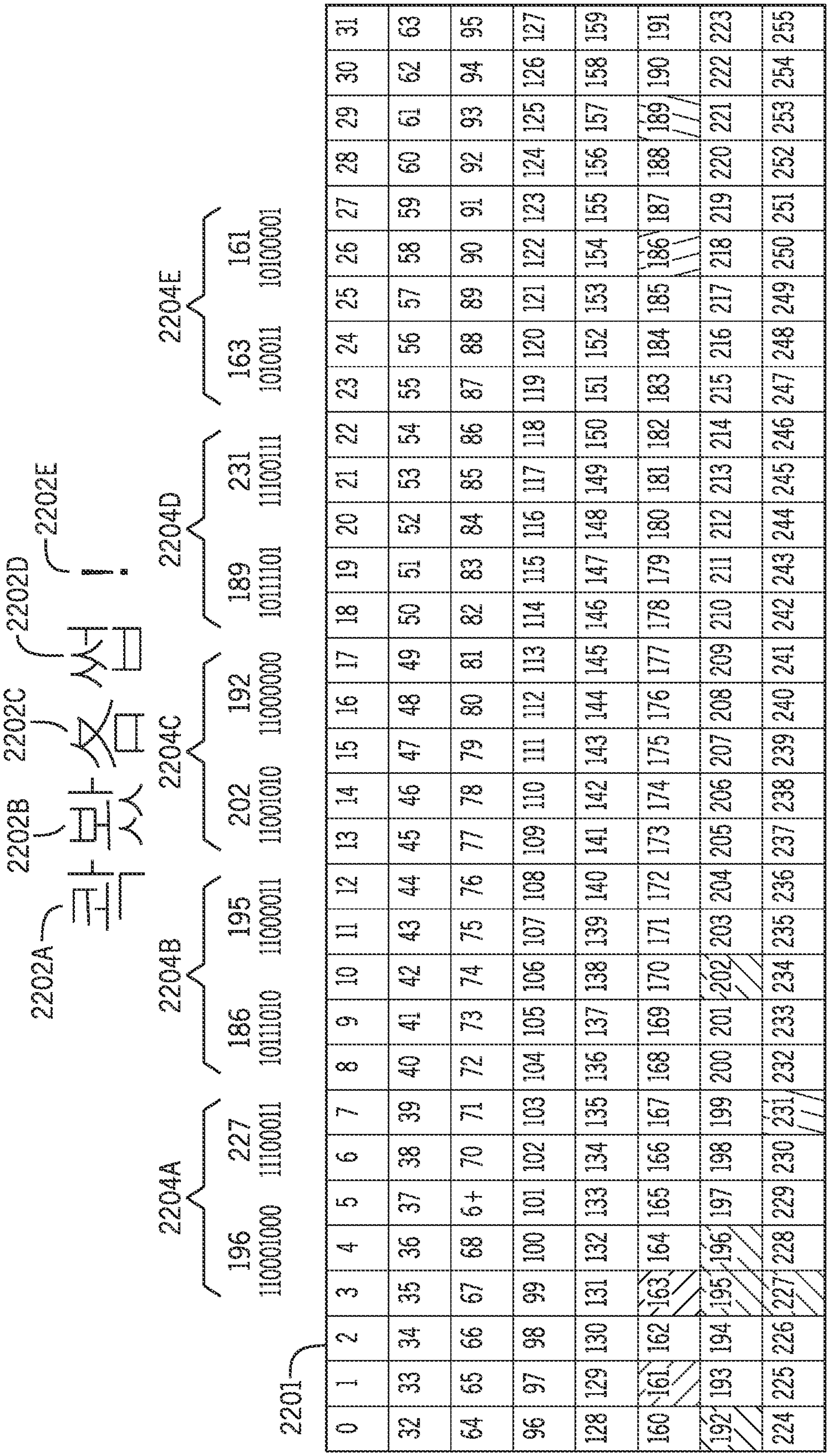
FIG. 22 illustrates generating Korean terms by mapping byte sequences to an LUT corresponding to a Korean writing system, in accordance with an embodiment of the present disclosure.

FIG. 11 illustrates training documents converted from a binary encoding of the text of training document 1002 to a base-10 numerical format, according to an embodiment of the present disclosure. While the training data of the training documents may be analyzed in binary format, the binary sequences are converted to base-10 for the purpose of clarity. As may be appreciated, each base-10 number conversion in the converted documents 1102, 1104, 1106, and 1108 corresponds to a letter in the respective training documents 1002, 1004, 1006, and 1008. For example, the letters "Pe" found in "Perfect" in the training document 1002 may be represented as "80 101" in the training document 1102. For example, FIG. 19 provides a grid of base-10 numbers and FIGS. 20-22 provide characters associated with base-10 numbers and/or combinations of base-10 numbers. For example, as illustrated in FIG. 20, "P" is represented by number "80" from the chart in FIG. 19. Further, "e" is represented by number "101".

Figure 12:
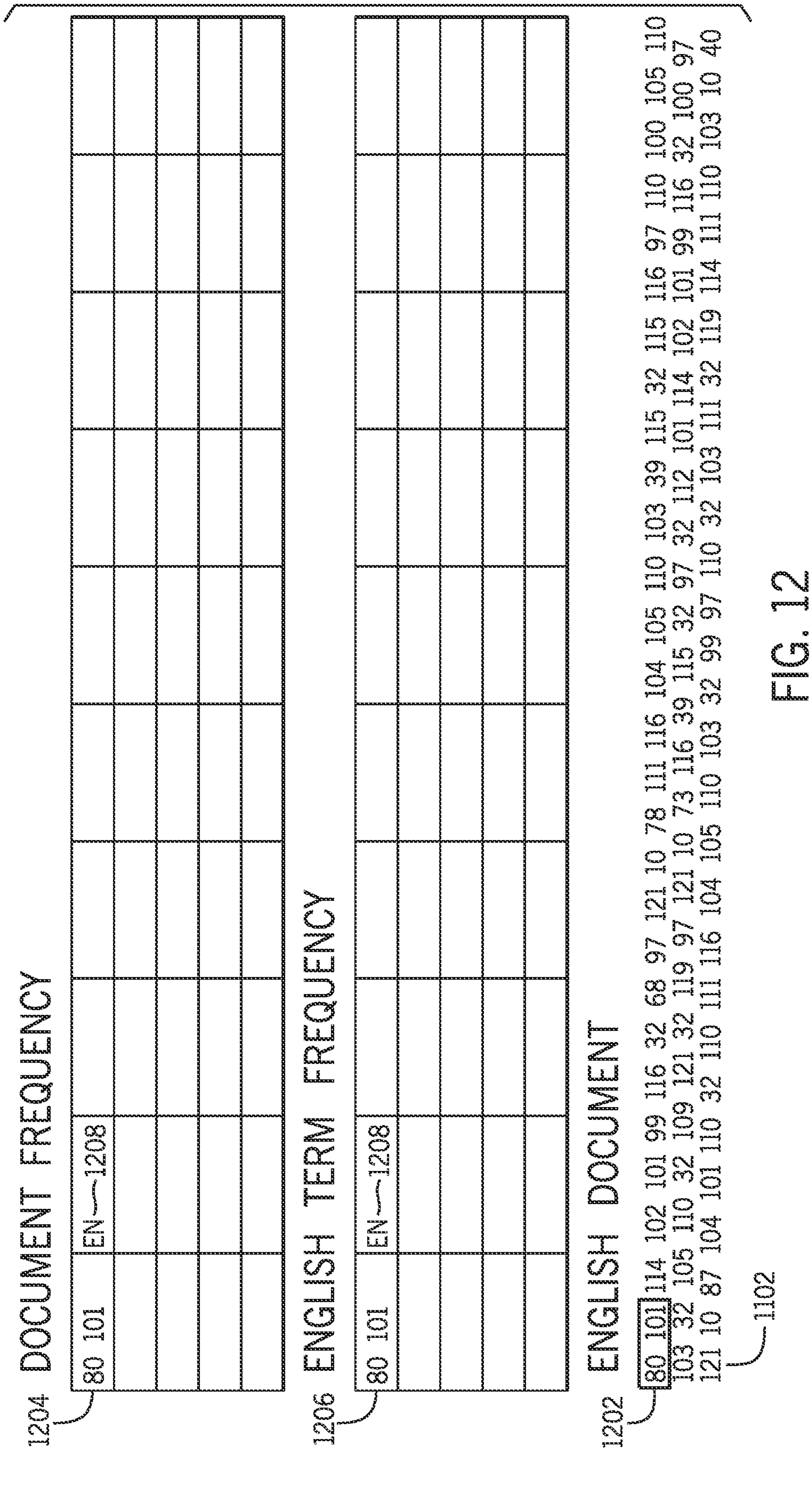
FIG. 12 is an illustration of analyzing training documents and recording results of the analysis, in accordance with an embodiment of the present disclosure.

FIG. 12 is an illustration of analyzing training documents and recording results of the analysis, according to an embodiment of the present disclosure. The training data may be procured by a software application, such as a training algorithm (e.g., a machine learning algorithm). A term 1202 of the training document 1102 may be analyzed by the training algorithm. The term 1202 may include a two-byte sequence (e.g., 80 and 101 in FIG. 12) corresponding to letters in the training document 1002 (e.g., "Pe"). Returning to FIG. 9, in process block 906 the training algorithm may store each term in a document frequency table (e.g., 1204). As may be observed in FIG. 12. The training algorithm may record the term 1202 in the document frequency table 1204 and append an English language identifier 1208 to indicate that the term 1202 occurs in at least one of the English training documents (e.g., for the purpose of calculating IDF).

Returning again to FIG. 9, in process block 908 the training algorithm may tabulate the frequency with which each term has appeared in one or more training documents for the known language. In FIG. 12, the training algorithm is analyzing the training document 1102, which the training algorithm knows to correspond to English. As may be observed, English TF table 1206 tabulates the TF of the term 1202 to indicate how frequently the term 1202 has occurred in the English language training data (e.g., 1102). As may be observed in field 1210 of the English TF table 1206, the term 1202 has occurred in the training document 1102 once, as this is the first term analyzed. As the training algorithm traverses through the rest of the document, additional occurrences of "80 101" may occur, which would result in an increase in the English term frequency in field 1210. Further, as the algorithm analyzes additional training documents, the TF of the term 1202 may increase.

Figure 13:
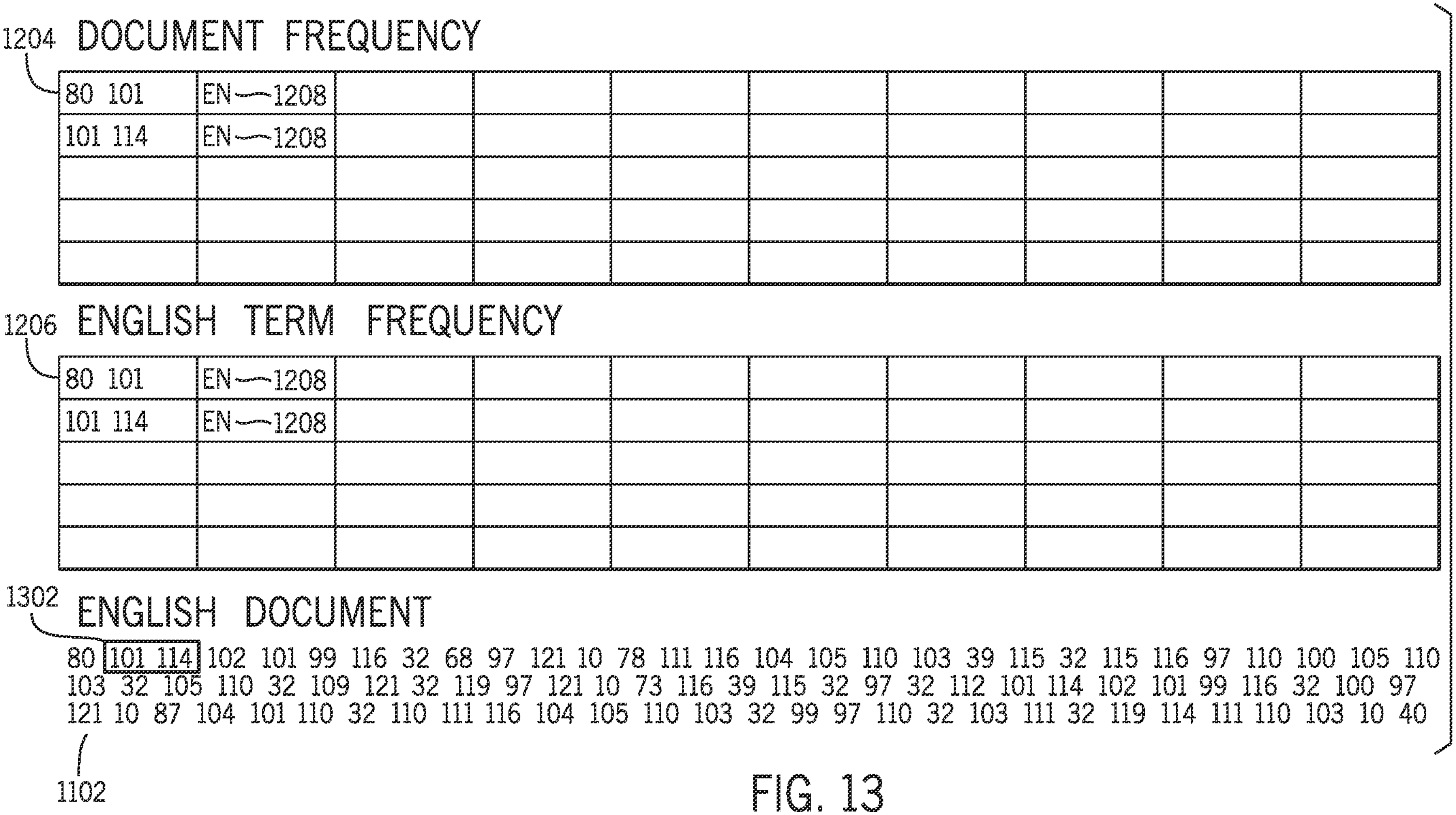
FIG. 13 is an illustration of analyzing a second term in a first training document of FIG. 12, in accordance with an embodiment of the present disclosure.

After tabulating the English TF in the English TF table 1206 and the document frequency in the document frequency table 1204 for the term 1202, the training algorithm may select and analyze another term (e.g., the next combination of numbers occurring in the English training document 1102). FIG. 13 is an illustration of analyzing a second term in the document 1102, according to an embodiment of the present disclosure. The training algorithm may analyze the term 1302 as discussed in FIG. 9 and FIG. 12. The English TF table 1206 is updated to indicate that the training algorithm has detected that the term 1302 has occurred in the training document 1102. The document frequency table 1204 is updated to indicate that the term 1302 has been detected in the English language training data, and the training algorithm appends the entry of the term 1302 with the English language identifier 1208. This process may be repeated by the training algorithm until each term in the training document 1102 has been analyzed and the document frequency and term frequency results for each term are stored.

FIG. 14 illustrates the training data results after the training algorithm has analyzed multiple English language training documents, according to an embodiment of the present disclosure. The English TF table 1206 now indicates the frequency with which each term occurs throughout the English language training documents. For example, it may be observed that the term 1202 has been detected in the training data 14 times, while the term 1302 has been detected in the training data 11 times. Once the training algorithm has analyzed the training document 1102 and other English language training documents, the training algorithm may analyze the remaining documents (e.g., 1104, 1106, and 1108).

While FIGS. 12-14 illustrate terms defined by combinations of two letters, additional rounds of term analysis may be performed where the terms are defined by other combinations (e.g., combinations of 3, 4, 5, etc. letters). By adding additional rounds of term analysis, additional levels of granularity in term occurrence may be identified, which may result in increased accuracy of language identification.

Training occurs for each of the possible languages (e.g., the languages of FIG. 2). The training occurs in a very similar manner, as described in relation to FIGS. 12-14. For example, FIG. 15 illustrates training data results after analyzing a first term of the German training document 1104, according to an embodiment of the present disclosure. Similar to FIGS. 12-14, the training algorithm may select and analyze the term 1502 of the training document 1104. The training algorithm may update the document frequency table 1204 and append a German language identifier 1506 to indicate that the term 1502 occurred in the German training document 1104 as well as the English training document 1102 (e.g., as indicated by the English language identifier 1208). The training algorithm also update German TF table 1504 to indicate that the training algorithm has detected that the term 1502 has occurred in the training document 1104 one time.

FIG. 16 illustrates training data results after analyzing a second term of the training document 1104, according to an embodiment of the present disclosure. Similar to FIG. 13, the training algorithm may analyze a second term (e.g., term 1602) of the training document 1104. After analyzing all terms in the German training document 1104, the training algorithm may proceed to analyze the Spanish training document 1106 and the French training document 1108.

FIG. 17 illustrates training data results in the document frequency table 1204 after the training algorithm has analyzed training documents in several languages, according to an embodiment of the present disclosure. As may be observed, some terms have significant overlap between languages. For example, the term 1202 has overlap between English and French (e.g., as indicated by the English language identifier 1208 and the French language identifier 1702). The term 1302 has overlap between English, German, French, and Spanish (e.g., as indicated by the English language identifier 1208, the German language identifier

1506, the French language identifier 1702, and the Spanish language identifier 1704). As will be discussed in greater detail, terms that occur in the training data of several different languages may not be as useful in determining the underlying language of the query file 702 as terms that are unique to one language or occur in few languages.

Figure 18:
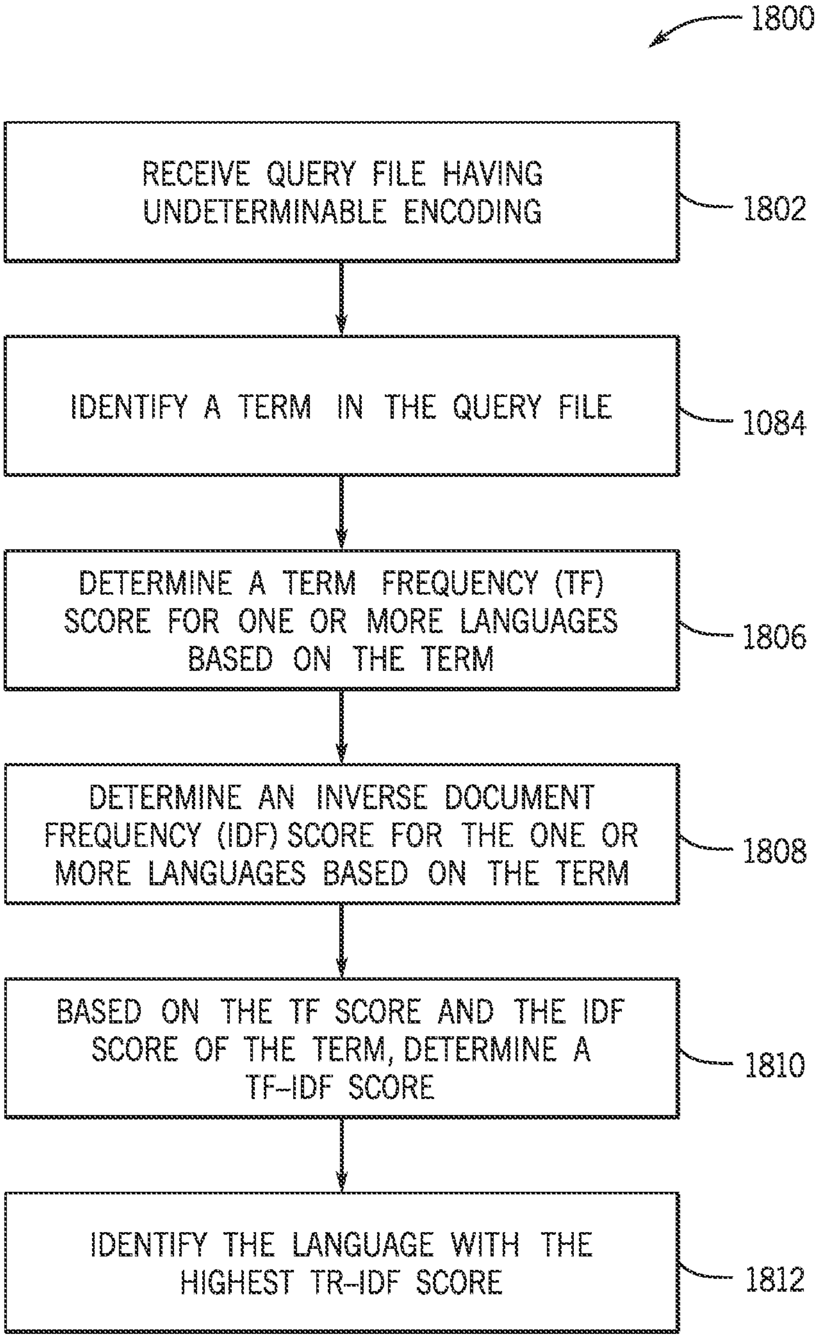
FIG. 18 is a flowchart of a process for carrying out the TF-IDF, in accordance with an embodiment of the present disclosure.

FIG. 18 is a flowchart of a process 1800 for carrying out the TF-IDF calculation (e.g., via the TF-IDF engine 704), according to an embodiment of the present disclosure. Any suitable device (e.g., a controller) that may control components of an electronic device, such as a processor, may perform the process 1800. In some embodiments, the process 1800 may be implemented by executing instructions stored in a tangible, non-transitory, computer-readable medium, such as memory or storage, using the processor. For example, the process 1800 may be performed at least in part by one or more software components, such as an operating system of the electronic device, one or more software applications of the electronic device, and the like. While the process 1800 is described using steps in a specific sequence, it should be understood that the present disclosure contemplates that the described steps may be performed in different sequences than the sequence illustrated, and certain described steps may be skipped or not performed altogether.

In process block 1802, the TF-IDF engine 704 may receive the query file 702 having an undeterminable encoding (e.g., a non-standard binary format), as previously discussed. In process block 1804, the TF-IDF engine 704 may identify one or more terms in the query file 702. FIG. 19 illustrates mapping bytes 1904 to an entry of a lookup table (LUT) 1902 to identify a term in the query file 702, according to an embodiment of the disclosure. The bytes 1904 (e.g., including 1904A, 1904B, 1904C, 1904D, 1904E, 1904G, 1904H, 1904I, 1904J, 1904K, and 1904L) may each correspond to one entry of the LUT 1902, the one entry indicating a character. In some embodiments, the LUT 1902 may have 256 entries (e.g., entry 0 to entry 255), since the binary file stores information in bytes (i.e., 8 bits), which enables storing 28, or 256, binary-encoded values. In other embodiments, the data in the query file 702 having a format with undeterminable encoding may be stored in units of various size (e.g., 6-bit, 32-bit, 64-bit, and so on) and the LUT 1902 may change size accordingly. Each byte 1904 may be converted from binary to base-10, and using the base-10 number corresponding entry of the LUT 1902 may be determined. For example, the byte 01100100 represents the number 100 in base-10.

FIG. 20 illustrates the terms of FIG. 19 as the bytes 1904 are mapped to an LUT 1902 corresponding to a Latin writing system, according to an embodiment of the present disclosure. Continuing with the example discussed in FIG. 19, the TF-IDF engine 704 may read the byte 01001000 and look to entry 72 in the LUT 1902, which corresponds to the letter "H." As may be observed in the LUT 1902, the character may be an alphabetical letter, a numeral, punctuation, a symbol, and so on. The term may be a sequence of bytes 1904 of any length (e.g., 2 bytes in length, 3 bytes in length, 4 bytes in length, 10 bytes in length, and so on). For example, in FIG. 19, the byte 1904A and the byte 1904B may be a term. The byte 1904A, 1904B, and 1904C together may be a term; and/or the bytes 1904A-1904L together may be a term. Mapping the bytes 1904A-1904L to the LUT 1902 generates the characters 2002A-2002L, generating the phrase "Hello World!" As such, the letters "H" and "e" may be a term; the letters "H," "e," and "1" may be a term; and the letters "1," "d," together with exclamation mark "!" may be a term, and so on. Turning to FIG. 21, it may be appreciated that characters 2102A-2102L belonging to another language of the Latin writing system (e.g., Spanish) may be generated by mapping the bytes 2104A-2104L to the same LUT 1902.

As may be observed in FIG. 22, however, languages that are not part of the Latin writing system (e.g., Korean) may not be able to be translated by the TF-IDF engine 704 using the LUT 1902, and thus may use a Korean writing system-mapped LUT 2201. As may be observed in FIG. 22, the Korean characters 2202A, 2202B, 2202C, 2202D, and 2202E each correspond to a two-byte sequence 2204A, 2204B, 2204C, 2204D and 2204E. For example, the TF-IDF engine 704 may analyze the byte sequence 11000100; 11100011 and convert the byte sequence to a base-10 equivalent of 196; 227. The TF-IDF engine 704 may then map the converted sequence 196 227 to the Korean writing system-mapped LUT 2201 to generate the character 2202A.

Returning to FIG. 18, in process block 1806, the TF-IDF engine 704 may determine a term frequency (TF) score for one or more languages based on the term. The TF score may be calculated using the following equation:

$$tf(t, d) = \frac{f_{t,d}}{\sum_{t' \in d} f_{t',d}};$$

where "t" is the term, "d" is the document, and tf(t, d) is the number of times a particular term (e.g., a particular sequence of bytes) appears in a document divided by the number of terms in that document. The TF-IDF engine 704 may obtain the number of times the particular term appears in the document by using training data obtained by a training algorithm (e.g., as illustrated by the English term frequency table 1206 and the German TF table 1504 in FIGS. 12-16). The document may refer to the training data for a particular language. As such, TF is a measure of the value of a term in a document wherein the value of the term increases as the frequency of the term in the document increases. It may be appreciated that determining that a term appears more or less frequently in one document (i.e., one language) than another document may enable the TF-IDF engine 704 to determine the correct language of the query file 702.

FIG. 23 is a table 2300 illustrating an example of term frequencies that may be used to determine the likelihood that a particular language is the language of the query file 702, according to an embodiment of the present disclosure. To determine a TF score for a variety of languages, the TF-IDF engine 704 may determine the TF of various terms in multiple potential languages. For example, the TF-IDF engine 704 may use the terms, represented by sequences of bytes 2302 (e.g., a two-byte sequence 2302A, a three-byte sequence 2302B, and a four-byte sequence 2302C) to determine the TF. The decoded term 2304, decoded in the Latin writing system, is provided for reference. Once the TF of the terms is identified, the TF-IDF engine 704 may then apply the TF equation discussed above to a number of documents representing different languages (e.g., Cajun French, Spanish, Metropolitan French, and Korean) to determine a TF score (e.g., 2306, 2308, 2310, and 2312) for each respective language. As may be observed from the table 2300, the term corresponding to the two-byte sequence 2302A (e.g., "Ch") appears somewhat equally throughout the first three languages, resulting in similar TF scores 2306, 2308, and 2310, while resulting in a much lower TF score 2312. This disparity in scores may be a result of the fact that the first three documents all share a writing system (i.e., the Latin writing system), where the Latin representation "Ch" may be frequently used, as opposed to the Korean language, which may very infrequently use the combination of these bytes 01000011; 01101000. The term corresponding to the three-byte sequence 2302B (e.g., "Che") occurs more frequently in Cajun French and Metropolitan French than it does in Spanish and Korean, resulting in a higher TF score 2306 and 2310 and a lower TF score 2308 and a lower TF score 1412. The term corresponding to the four-byte sequence 2302C (e.g., "Cher") occurs most frequently in Cajun French, thus resulting in a higher TF score 2306 and lower TF scores 2308, 2310, and 2312. Accordingly, at this point, it appears that Korean is likely not the language of this query file and, instead, French (Cajun) is the most likely. However, additional processing may be desirable to provide a more accurate result.

Returning to FIG. 18, in process block 1808, the TF-IDF engine 704 may determine an IDF score for the term. The IDF score may be calculated using the following formula:

$$idf(t, D) = \log\frac{N}{|\{d \in D: t \in d\}| + 1},$$

where "D" is the set of documents (i.e., the list of potential languages); "N" is the number of documents in D (i.e., the number of potential languages); $|\{d\in D: t\in d\}|+1$ is the number of documents (i.e., the number of language) that the term t appears plus one in case the term is not in any documents, which would lead to division by zero; and idf(t, D) is a logarithmically scaled inverse fraction of the number of documents containing a term. The document frequency (i.e., the number of documents containing the term) may be obtained from the document frequency table 1204 discussed in FIGS. 12-17. As such, IDF is a measure of the value of a term in a document (e.g., language) wherein the value of the term decreases as the frequency of the term in the set of documents (e.g., languages) increases. In other words, using the IDF, if a term is found in many languages, it may be deemed less valuable than a term that is found in relatively fewer languages. The function of IDF is to filter out words that are too common across languages to be helpful in identifying the language of the query file 702. As the IDF is essentially a measure of the total number of documents (e.g., languages) divided by the number of documents (e.g., languages) in which the term occurs, a lower IDF score correlates to a greater frequency of the term across languages, while a greater IDF score correlates to a lesser frequency of the term across languages. For example, returning briefly to FIG. 17, assuming that there are four languages in the set of documents (e.g., English, French, German, Spanish), the term 1202 would have an IDF score of 0.125, while the term 1302 would have an IDF score of −0.097, as the term 1202 appears in fewer languages (e.g., English and French) than the term 1302 (e.g., English, German, French, and Spanish). Accordingly, the term 1202 may be more helpful in determining the language of a query file (e.g., 702) than the term 1302.

In some embodiments, the TF-IDF engine 704 may determine an IDF score threshold, at or below which a term may be filtered out of the total cumulative TF-IDF score for a language. In other embodiments, the TF-IDF engine 704 may apply one or more weighting factors to the term based on the IDF score. For example, if a particular term is determined to have a low IDF score (i.e., indicating the term is common to many languages) the TF-IDF engine 704 may weight that term as less useful when determining the total cumulative TF-IDF score of a language. However, if the particular term is determined to have a high IDF score (i.e., indicating the term is unique to certain languages) the TF-IDF engine 704 may weight that term heavily as the term may be useful when determining the TF-IDF score of the language. Using the IDF score, along with the TF score discussed earlier, the TF-IDF engine 704 may determine and apply a language-specific TF-IDF weight to each language based on the TF score and the IDF score.

In process block 1810 of FIG. 18, the TF-IDF engine 704 may determine, based on the TF score and the IDF score determined in process block 1806 and the process block 1808 respectively, a TF-IDF score for each document (i.e., each language) analyzed. The TF-IDF engine 704 may collect a set of terms from the query file 702. The TF-IDF engine 704 may obtain a set of languages where each term appears from a document frequency table. The TF-IDF engine 704 may analyze each language in the set of languages according to how many times the various terms occur in each language. The TF-IDF engine 704 may apply the language-specific TF-IDF weighting to a cumulative score for each language. The TF-IDF engine 704 may, based on the TF-IDF weighting, determine the language with the highest cumulative score, and thus identify the language of the query file 702 with a high degree of accuracy. The TF-IDF engine 704 may then pass the results including the identified language to the client device 706 to enable the client device 706 to decode the query file 702.

In process block 1812, the language with the greatest TF-IDF score may be identified. The TF-IDF scores for each term throughout the different languages in the set D may be accumulated. Based on the accumulated TF-IDF scores, a confidence score (e.g., represented as a percentage confidence) may be assigned to each language in the set D. For example, the language with the highest TF-IDF score may be assigned the greatest confidence score percentage, while the language with the lowest TF-IDF score may be assigned the lowest confidence score percentage.

Figure 24:
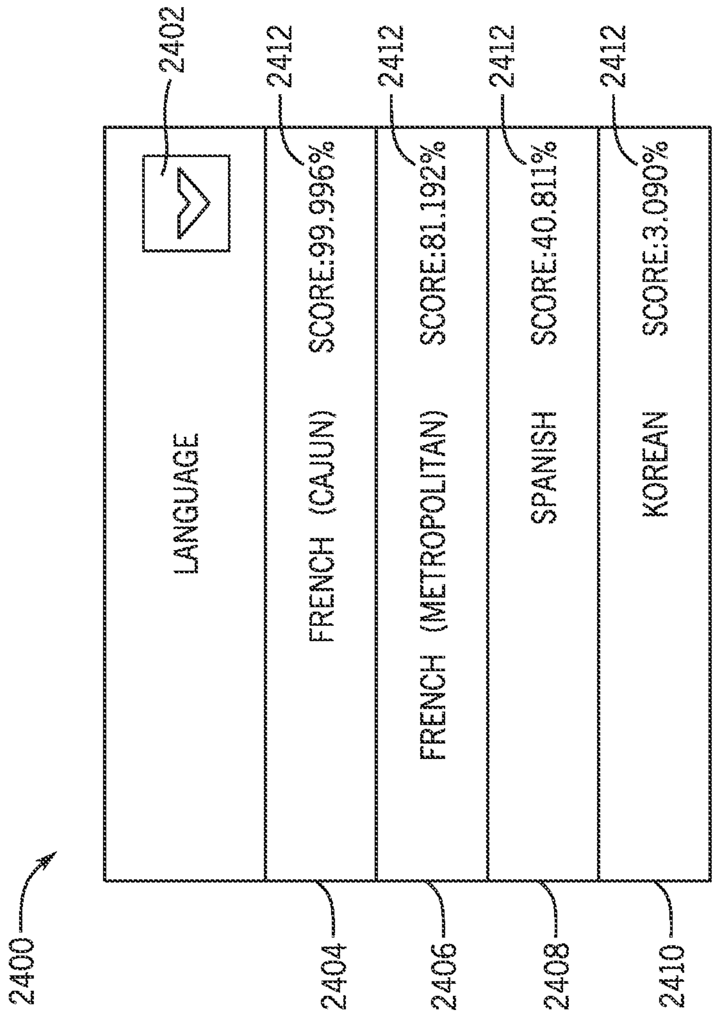
FIG. 24 is a results menu displaying a confidence score of a set of languages based on the results of the TF-IDF engine, in accordance with an embodiment of the present disclosure.

FIG. 24 illustrates a results menu 2400 based on the results of the TF-IDF engine 704, according to an embodiment of the present disclosure. The results menu 2400 may include a dropdown button 2402. The dropdown button 2402, when selected, displays entries 2404, 2406, 2408, and 2410. The entries may each include a language analyzed by the TF-IDF engine 704 and associated confidence score 2412; the confidence score indicating a likelihood that a language is the language of the query file 702. The confidence score 2412 may be based on a TF score (e.g., 2405, 3208, 2310, and 2312), and IDF score. As previously discussed, the IDF score may be based on the document frequency table 1204. A user may select an entry as the identified language of the query file. For example, if the confidence score 2412 is highest for Cajun French, but a user believes it is more likely that Metropolitan French is the correct language, the user may select Metropolitan French as the language to be associated with the query file 702. Additionally or alternatively, the TF-IDF engine 704 may automatically select the language with the highest confidence score 2412, or may only automatically select the language with the highest confidence score 2412 if the confidence score 2412 exceeds a certain threshold (e.g., greater than or equal to 90% confidence, greater than or equal to 99% confidence, and so on).

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

What is claimed is:

1. A tangible, non-transitory, computer-readable medium, comprising computer-readable instructions that, when executed by one or more processors of an electronic device, cause the electronic device to:

prior to determining an encoding scheme of a file, identify a language of the file, wherein the file is encoded in a language-specific encoding scheme, by:

identifying, for each potential language of the file, a language score of one or more bit sequences of the file using a term frequency (TF) indicating a frequency of the one or more bit sequences within a training document of the potential language and an inverse document frequency (IDF) based upon a frequency of the one or more bit sequences in a collection of training documents of a plurality of the potential languages; and selecting a language associated with a highest one of the language scores as the language of the file;

associate the language of the file with the file; and decode the file using a decoding scheme that corresponds to the language associated with the file.

2. The tangible, non-transitory, computer-readable medium of claim 1, wherein the file comprises the file having a file format with an undeterminable encoding scheme that is non-standard, language-dependent, and is undeterminable without first knowing the language of the file, because the file is encoded differently based upon the language of the file.

3. The tangible, non-transitory, computer-readable medium of claim 2, wherein the collection of training documents comprise the undeterminable encoding scheme, and wherein an underlying language of the collection of training documents is identified.

4. The tangible, non-transitory, computer-readable medium of claim 1, wherein the one or more bit sequences are correlated to a particular language at least in part by determining term frequency, where the term frequency comprises how frequently a term occurs in a subset of the collection of training documents associated with the particular language.

5. The tangible, non-transitory, computer-readable medium of claim 4, wherein the one or more bit sequences are correlated to the particular language at least in part by determining a number of languages in which the one or more bit sequences occur.

6. The tangible, non-transitory, computer-readable medium of claim 5, wherein the one or more bit sequences are correlated to the particular language by mapping each bit sequence of the one or more bit sequences to an entry of a lookup table corresponding to a particular character of the particular language.

7. A method, comprising:

training a machine learning model to enable identification, for each potential language of a file, a language score using a term frequency (TF) and an inverse document frequency (IDF) of terms within the file, by:

receiving a training document comprising a language-specific encoding scheme associated with an identified language, wherein the language specific encoding scheme comprises a non-standard encoding that encodes differently based upon a language being encoded;

identifying terms in the training document, wherein each term comprises a bit sequence in a non-textual format and at least a first portion of the terms have a different length than a second portion of the terms;

associating the bit sequence of each identified term with the identified language;

storing the bit sequence of each identified term in a data store;

tabulating a term frequency comprising a number of times in which the bit sequence of each identified term appears in the training document;

tabulating an inverse document frequency comprising a number of times which the bit sequence of each identified term appears in a collection of training documents of a plurality of the potential languages;

storing the term frequency and inverse document frequency in the data store;

identifying a language of an input file using the machine learning model; and decoding the file using a decoding scheme that corresponds to the identified language.

8. The method of claim 7, further comprising receiving a second training document comprising the language-specific encoding scheme associated with a second identified language, wherein the second identified language is different than the identified language.

9. The method of claim 8, further comprising:

identifying terms in the second training document, wherein each term comprises the non-textual format;

associating each identified term with the second identified language;

storing each identified term in the data store;

tabulating term frequency of the second training document comprising the number of times in which each identified term appears in the second training document; and storing the term frequency of the second training document in the data store.

10. The method of claim 9, further comprising determining document frequency, wherein document frequency comprises an indication of whether a particular identified term appears in the training document, the second training document, or both.

11. The method of claim 10, further comprising receiving a query document, wherein the query document comprises an undeterminable encoding scheme associated with an unidentified language.

12. The method of claim 11, wherein the query document comprises a set of unidentified terms comprising the non-textual format.

13. The method of claim 12, wherein each unidentified term of the set of unidentified terms is analyzed in comparison to term frequency statistics and inverse document frequency statistics stored in the data store.

14. The method of claim 13, further comprising, in response to analyzing each unidentified term of the set of unidentified terms, determining a first confidence score for the identified language, wherein the first confidence score indicates a likelihood that the unidentified language is the same as the identified language.

15. The method of claim 14, further comprising, in response to analyzing each unidentified term of the set of unidentified terms, determining a second confidence score for the second identified language, wherein the second confidence score indicates a likelihood that the unidentified language is the same as the second identified language.

16. An electronic device configured to:

receive, via a processor, a query file encoded via an undeterminable encoding scheme that is undeterminable without first knowing a language of the query file;

prior to determining an encoding scheme of the query file, determine, via the processor, the language of the query file by identifying, for each potential language of the query file, a language score of one or more bit sequences of the query file using a term frequency (TF) indicating a frequency of the one or more bit sequences within a training document of the potential language and an inverse document frequency (IDF) based upon a frequency of the one or more bit sequences in a collection of training documents of a plurality of the potential languages; and select a language associated with a highest one of the language scores as the language of the query file;

associate the language of the query file with the query file; and decode the query file using a decoding scheme that corresponds to the language associated with the query file.

17. The electronic device of claim 16, wherein the electronic device is further configured to receive, via the processor, a first training document having a first identified language.

18. The electronic device of claim 17, wherein the electronic device is further configured to receive, via the processor, a second training document having a second identified language, wherein the second identified language is different than the first identified language.

19. The electronic device of claim 18, wherein determining the language of the query file comprises determining whether the language of the query file is the first identified language, the second identified language, or neither.

* * * * *